(12) United States Patent
Nakamura et al.

(10) Patent No.: US 7,496,620 B2
(45) Date of Patent: Feb. 24, 2009

(54) CALCULATION APPARATUS

(75) Inventors: Takatoshi Nakamura, Yokkaichi (JP);
Akihiro Yokota, Yokkaichi (JP)

(73) Assignee: NTI, Inc., Mie (JP)

( * ) Notice: Subject to any disclaimer, the term of this patent is extended or adjusted under 35 U.S.C. 154(b) by 927 days.

(21) Appl. No.: 10/475,945

(22) PCT Filed: Apr. 23, 2002

(86) PCT No.: PCT/JP02/04040

§ 371 (c)(1),
(2), (4) Date: Apr. 8, 2004

(87) PCT Pub. No.: WO02/088929

PCT Pub. Date: Nov. 7, 2002

(65) Prior Publication Data

US 2004/0215675 A1 Oct. 28, 2004

(30) Foreign Application Priority Data

Apr. 24, 2001 (JP) ............................. 2001-126458
Apr. 24, 2001 (JP) ............................. 2001-126460

(51) Int. Cl.
*G06F 7/00* (2006.01)
(52) U.S. Cl. .................................................... 708/490
(58) Field of Classification Search .................. 708/490
See application file for complete search history.

(56) References Cited

U.S. PATENT DOCUMENTS

| 5,692,163 | A | | 11/1997 | Fukushima | |
|---|---|---|---|---|---|
| 5,819,102 | A | * | 10/1998 | Reed et al. | ..................... 712/34 |
| 5,862,400 | A | | 1/1999 | Reed et al. | |
| 6,553,394 | B1 | * | 4/2003 | Perry et al. | .................. 708/200 |
| 7,272,621 | B2 | * | 9/2007 | de Brebisson | ............... 708/131 |

FOREIGN PATENT DOCUMENTS

JP       11-272691       10/1999

* cited by examiner

*Primary Examiner*—Tan V Mai
(74) *Attorney, Agent, or Firm*—Merchant & Gould P.C.

(57) ABSTRACT

A calculation apparatus outputting a calculation result in accordance with an input condition and capable of increasing the processing speed. As a data of an address corresponding to an input condition of an calculation formula, its calculation result is stored in a memory and when the input condition is input to the memory, the calculation result is output. Moreover, the calculation apparatus executes calculation of a predetermined calculation formula and by learning, can output a calculation result at a high speed with a simple configuration. Storage means for outputting data corresponding to an address stores a calculation formula in which input is correlated to an address and output is correlated to data, and the calculation formula is selectively stored in accordance with the use frequency of the calculation formula.

5 Claims, 28 Drawing Sheets

Fig.4

| ADD01 | D11(D21 • • • Dm1) |
|---|---|
| ADD02 | D12(D21 • • • Dm2) |
| ⋮ | ⋮ |
| ADD0n | D1n(D21 • • • Dmn) |

| Address | | Data |
|---|---|---|
| Arithmetic equation | Input | Output |
| f1 | A1 | D11 |
| | A2 | D12 |
| | : | : |
| | Am | D1m |
| f2 | A1 | D21 |
| | A2 | D22 |
| | : | : |
| | Am | D2m |
| : | : | : |
| fn | A1 | Dn1 |
| | A2 | Dn2 |
| | : | : |
| | Am | Dnm |

| Arithmetic equation | Appearance frequency |
|---|---|
| f1 | e1 |
| f2 | e2 |
| ⋮ | ⋮ |
| fx | ex |
| ⋮ | ⋮ |
| fn | en |

| Address | Data |
|---------|------|
| A1 | d 1 |
| A2 | d 2 |
| ⋮ | ⋮ |
| Am | d m | ized
CALCULATION APPARATUS

FIELD OF THE INVENTION

This invention relates to arithmetic device, especially relates to arithmetic device which outputs the arithmetic result according to input conditions.

DESCRIPTION OF THE PRIOR ART

Common arithmetic device has build-in arithmetic-logic unit which responds to arithmetic program when input exist, and then acquires the output.

Nevertheless, common arithmetic device need repeat the arithmetic corresponding to arithmetic equation according to arithmetic program, so the arithmetic speed is low.

In general, for example, when program deals with CASE declaration, CPU compares conditional declaration temporarily and outputs consistence result after checking whether conditional declaration is consistent with input. Therefore, when there are n conditions, it requires at most n comparisons of conditional declaration.

Therefore, because CPU need execute CASE declarations in turn, common program algorithms have disadvantages that, for example, processing time lengthens, etc. In particular, when inconsistent CASE declarations in conditional equation repeat again and again, comparison times of conditional branches goes up, so processing speed goes down on a large scale.

In view of the above disadvantages, this invention aims to develop an arithmetic device which can execute high-speed processing.

SUMMARY OF THE INVENTION

Arithmetic device in this invention exports arithmetic result corresponding to the input, including: memory means that stores the arithmetic result corresponding to input at the address corresponding to input, and control device which refreshes the storage synchronously with the arithmetic.

According to this invention, arithmetic result can be acquired as soon as input is read to address, which can execute high-speed processing. Besides, to refresh arithmetic result synchronously with the arithmetic can deal with a variety of arithmetic equations with small memory capacity.

Besides, through memory means by which output are corresponding to data address, arithmetic device of this invention stores arithmetic equation which is selected according to appearance ratio. Input of arithmetic equation is corresponding to address, and output corresponding to data.

According to this invention, mnemonic stores arithmetic equation according to frequency, so the arithmetic equation selected by learning can execute arithmetic.

FIGURES EXPLANATION

FIG. 4 is mnemonic data structure of implementation example 1 of this invention.

Figure 7:
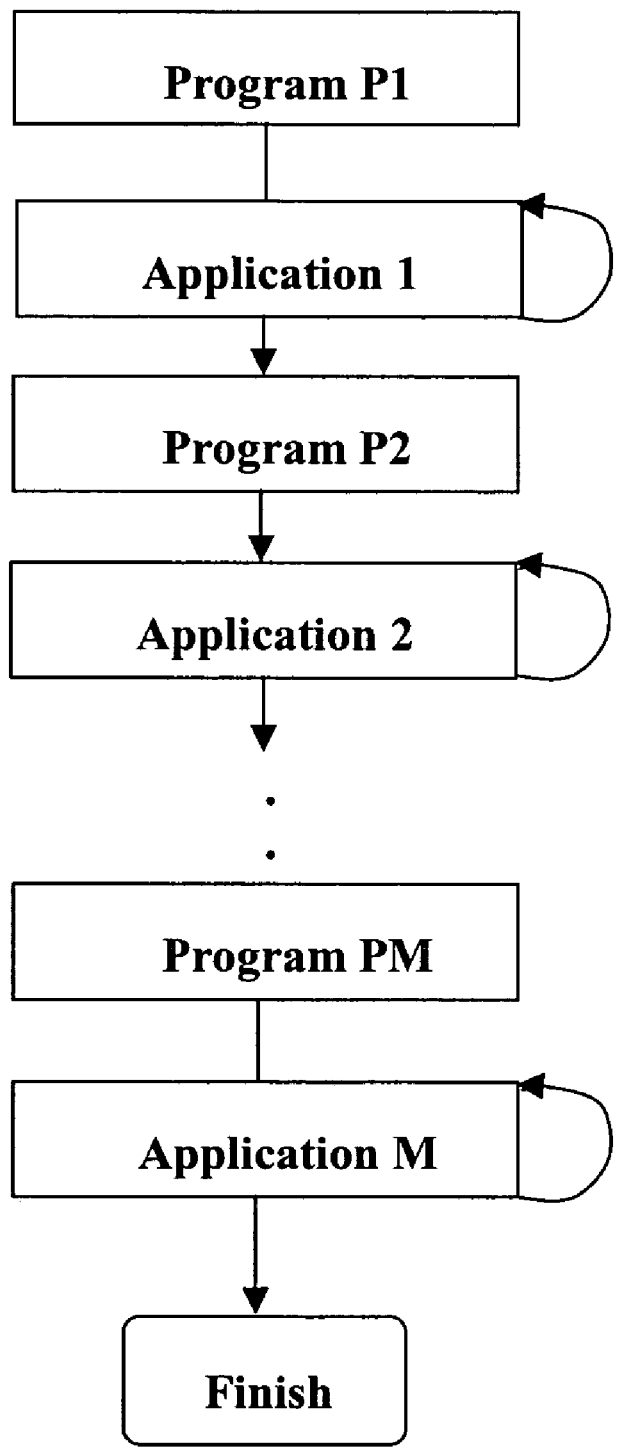

FIG. 7 explains the application example of implementation example 1 of this invention.

Figure 8:
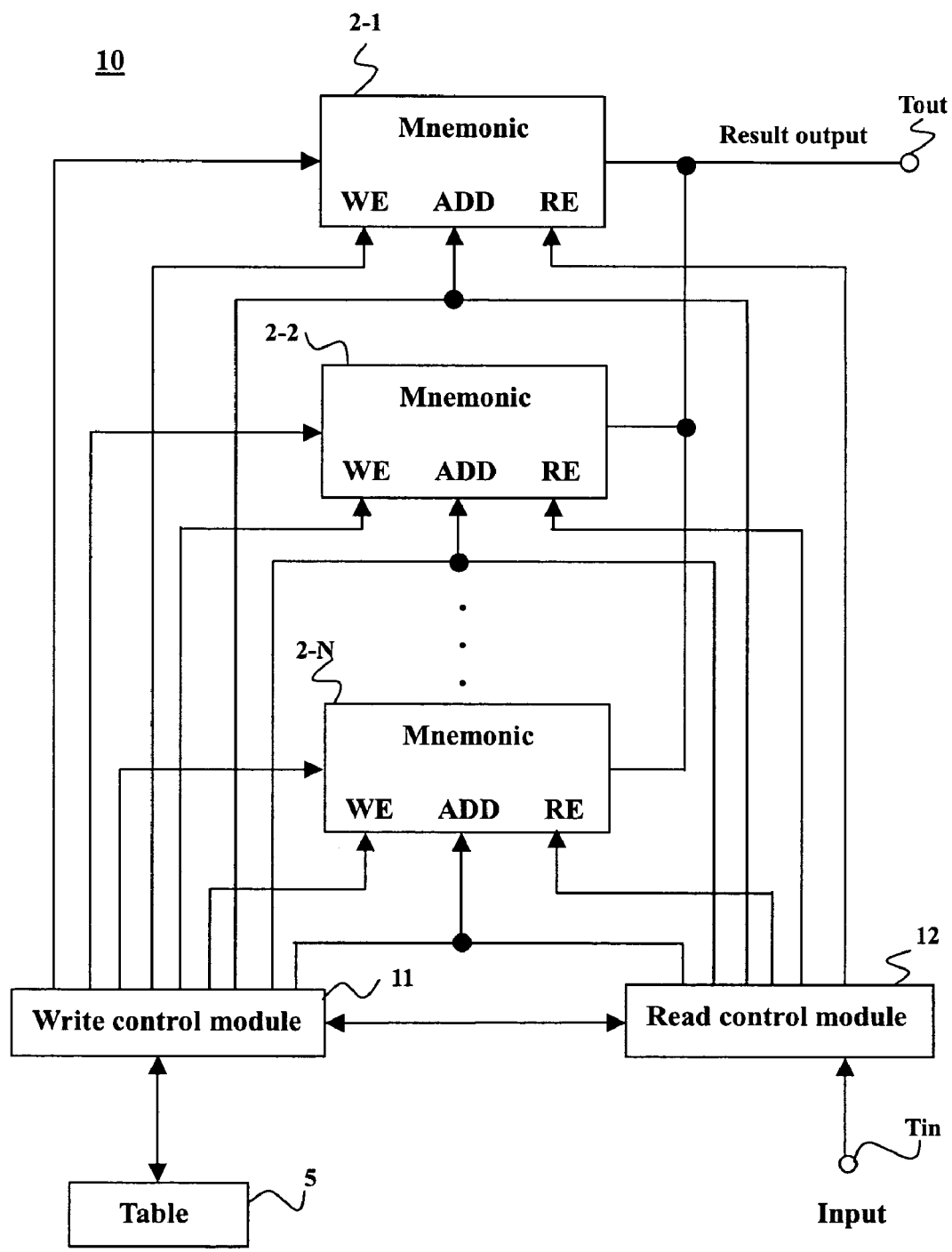

FIG. 8 is the block diagram of implementation example 2 of this invention.

Figure 9:
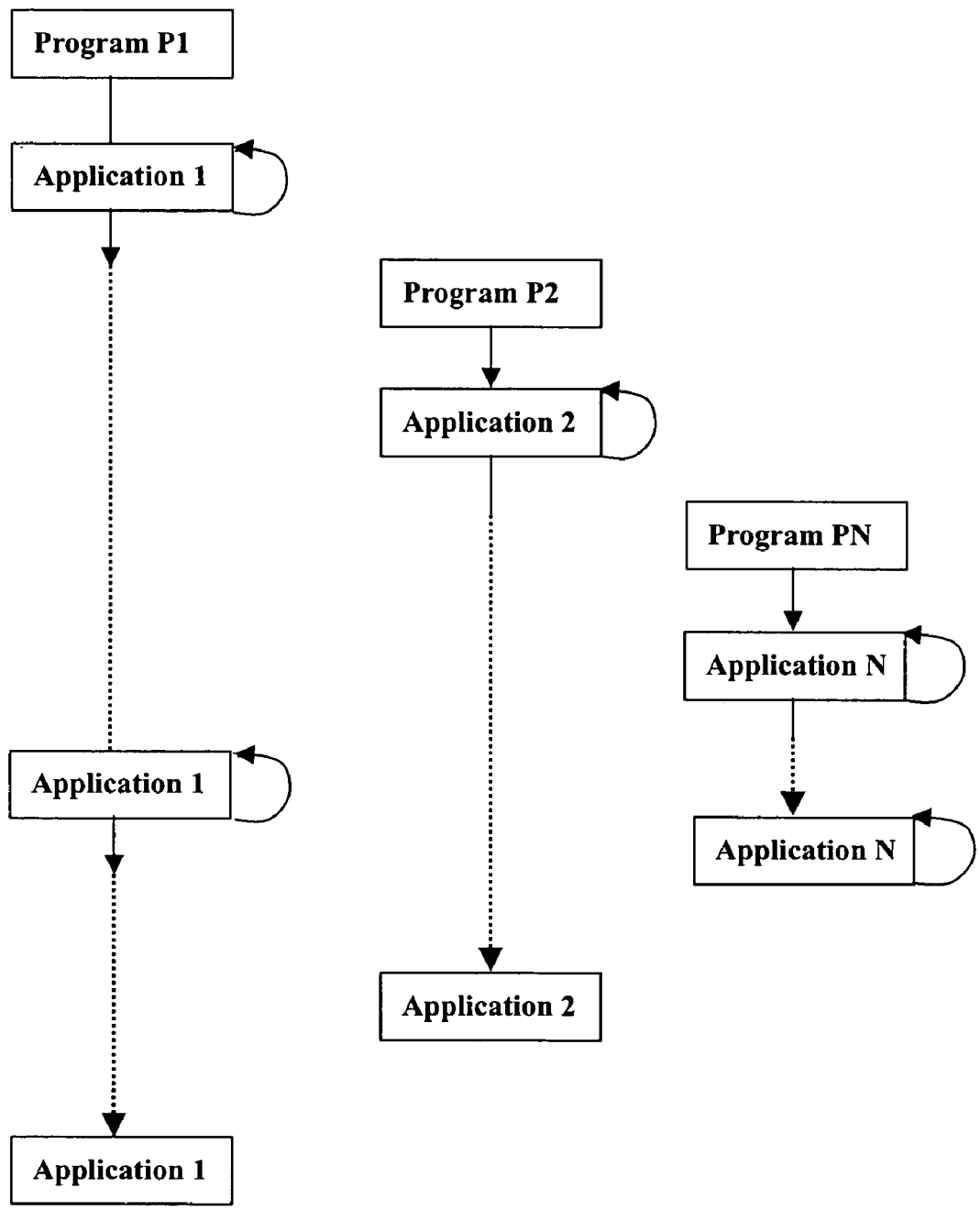

FIG. 9 explains the application example of implementation example 2 of this invention.

FIG. 10(A)~(C) are the block diagrams of application examples of this invention.

Figure 11:
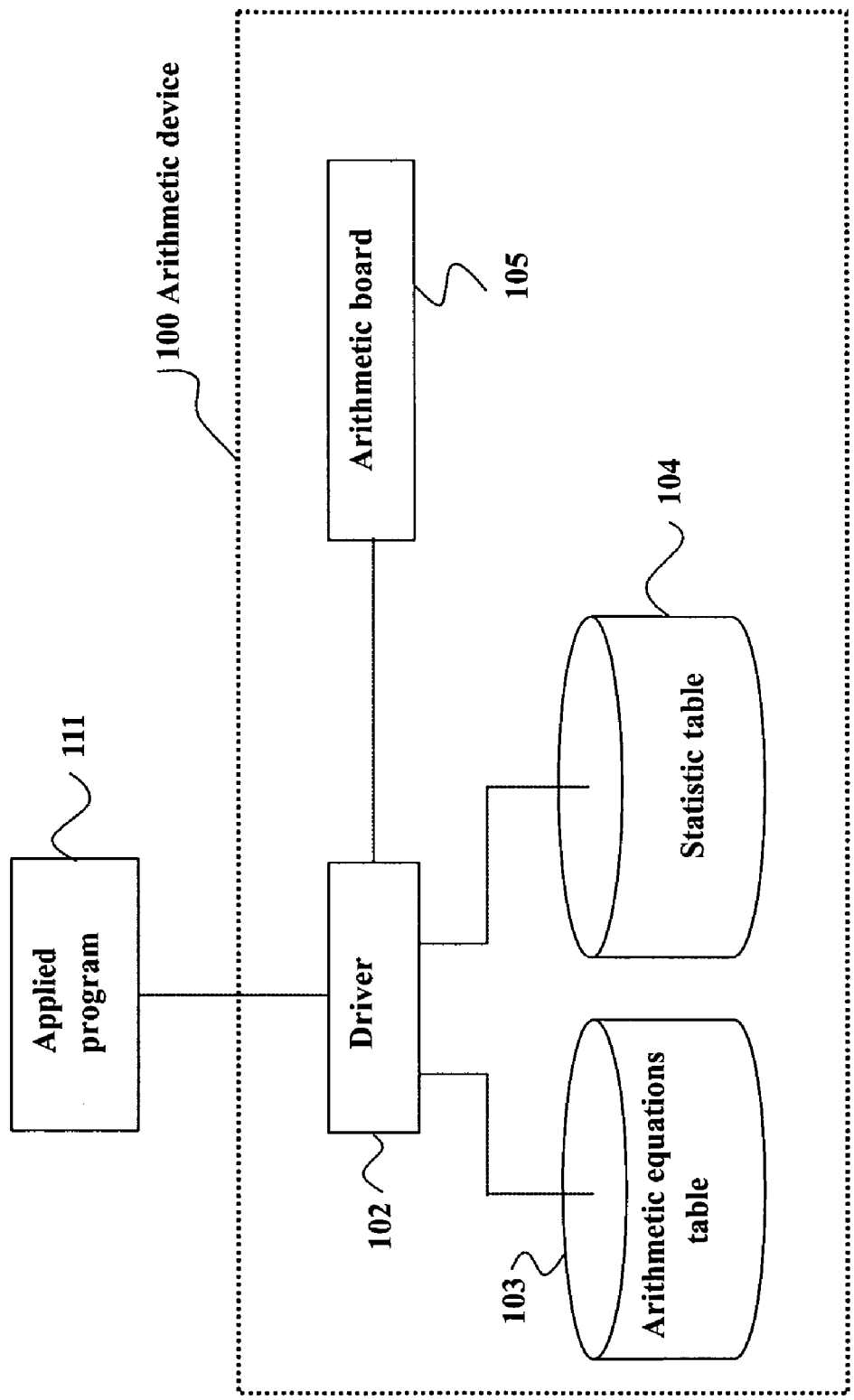

FIG. 11 is the block diagram of implementation example 3 of this invention.

Figure 12:
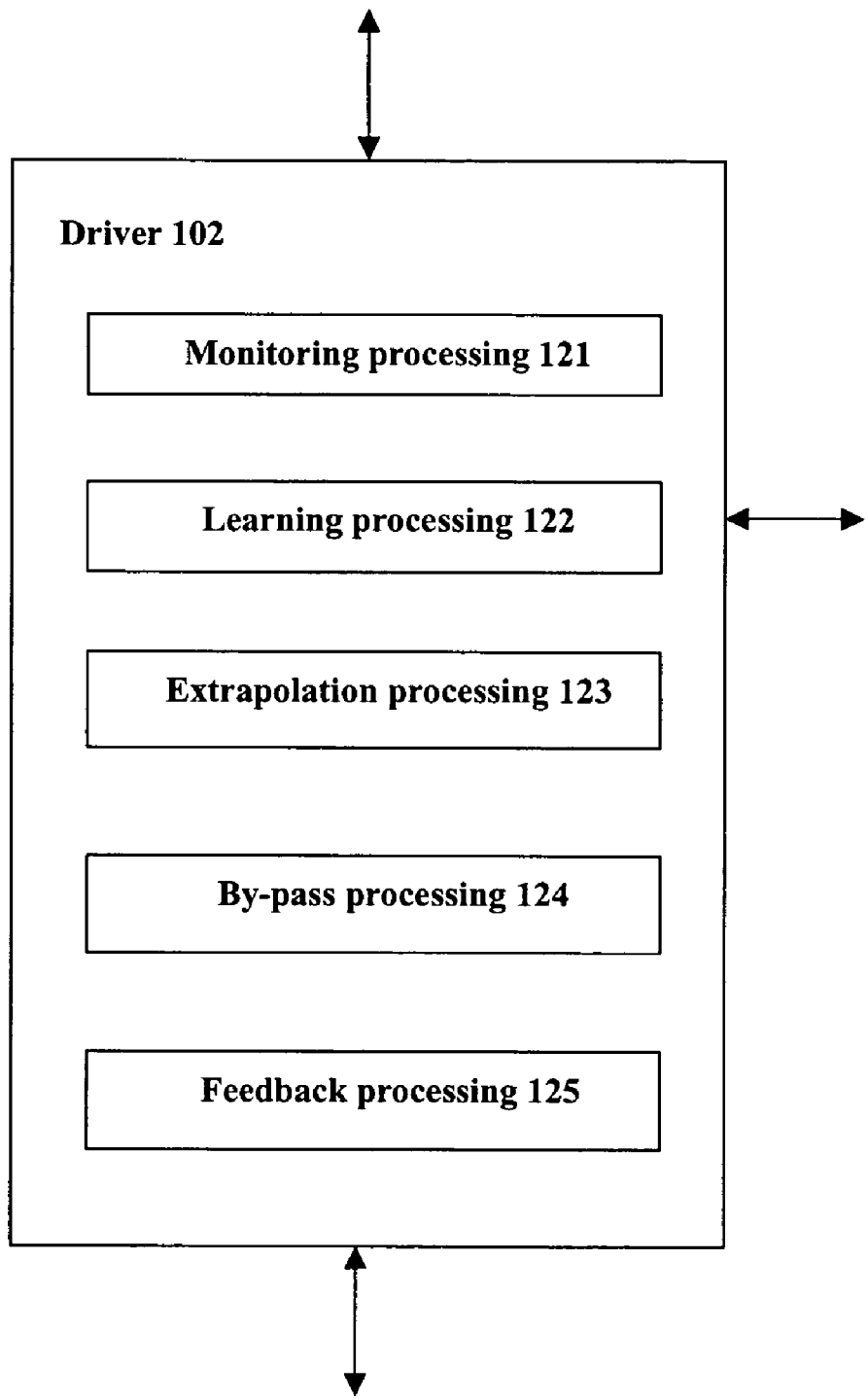

FIG. 12 is driver functional block diagram of implementation example 3 of this invention.

FIG. 13 is the data structure of arithmetic equation table implementation example 3 of this invention.

FIG. 14 is the data structure of statistic table of implementation example 3 of this invention.

Figure 15:
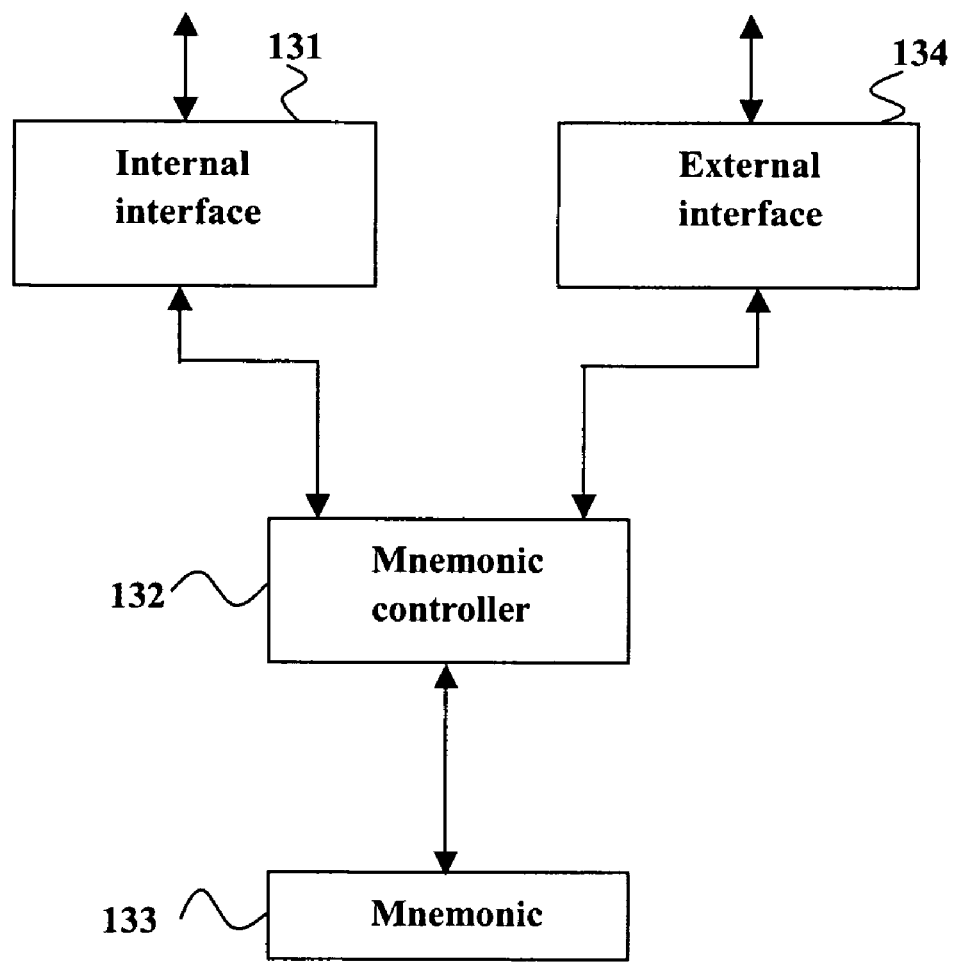

FIG. 15 is the block diagram of arithmetic board of implementation example 3 of this invention.

Figure 16:
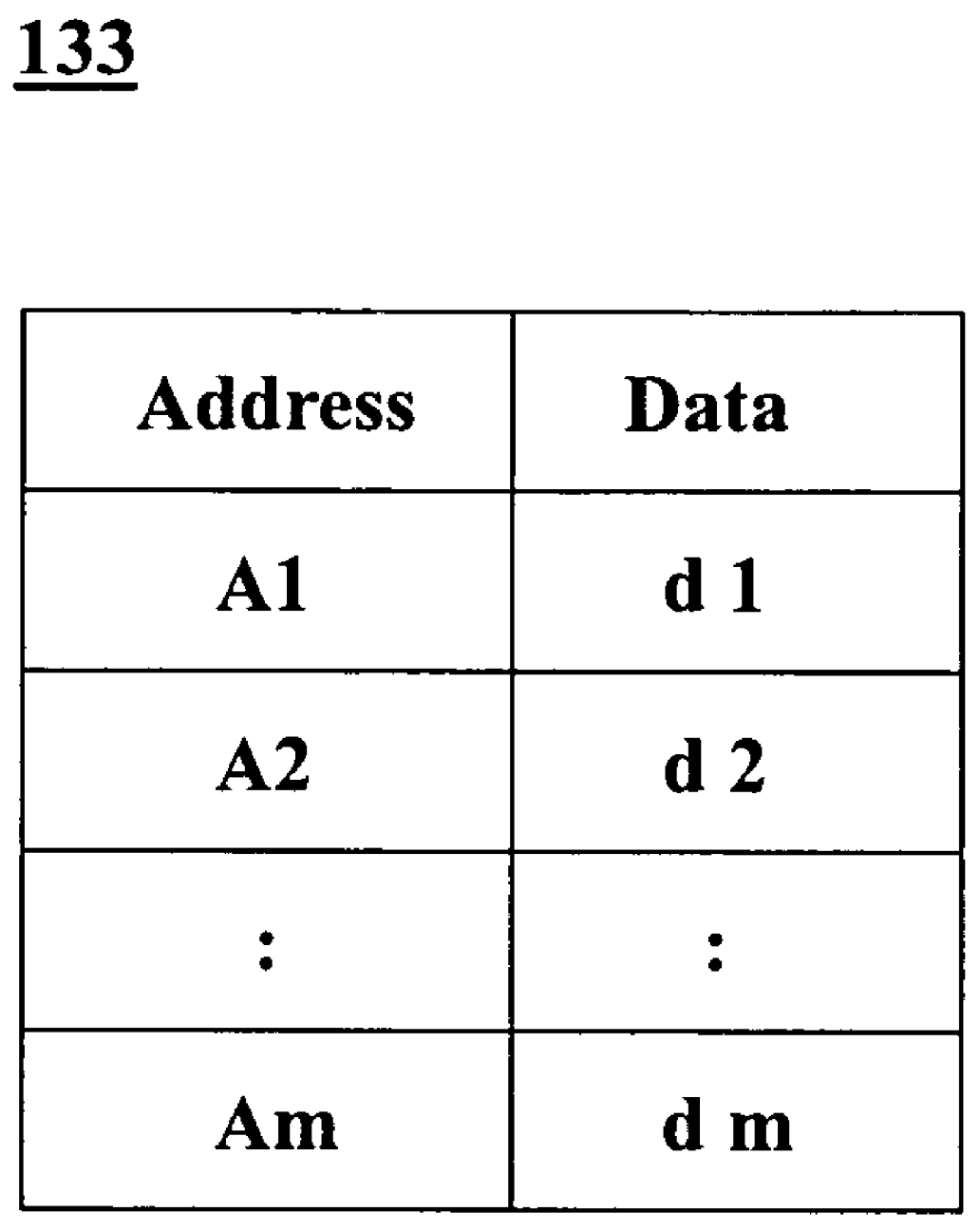

FIG. 16 is mnemonic data structure of implementation example 3 of this invention.

Figure 17:
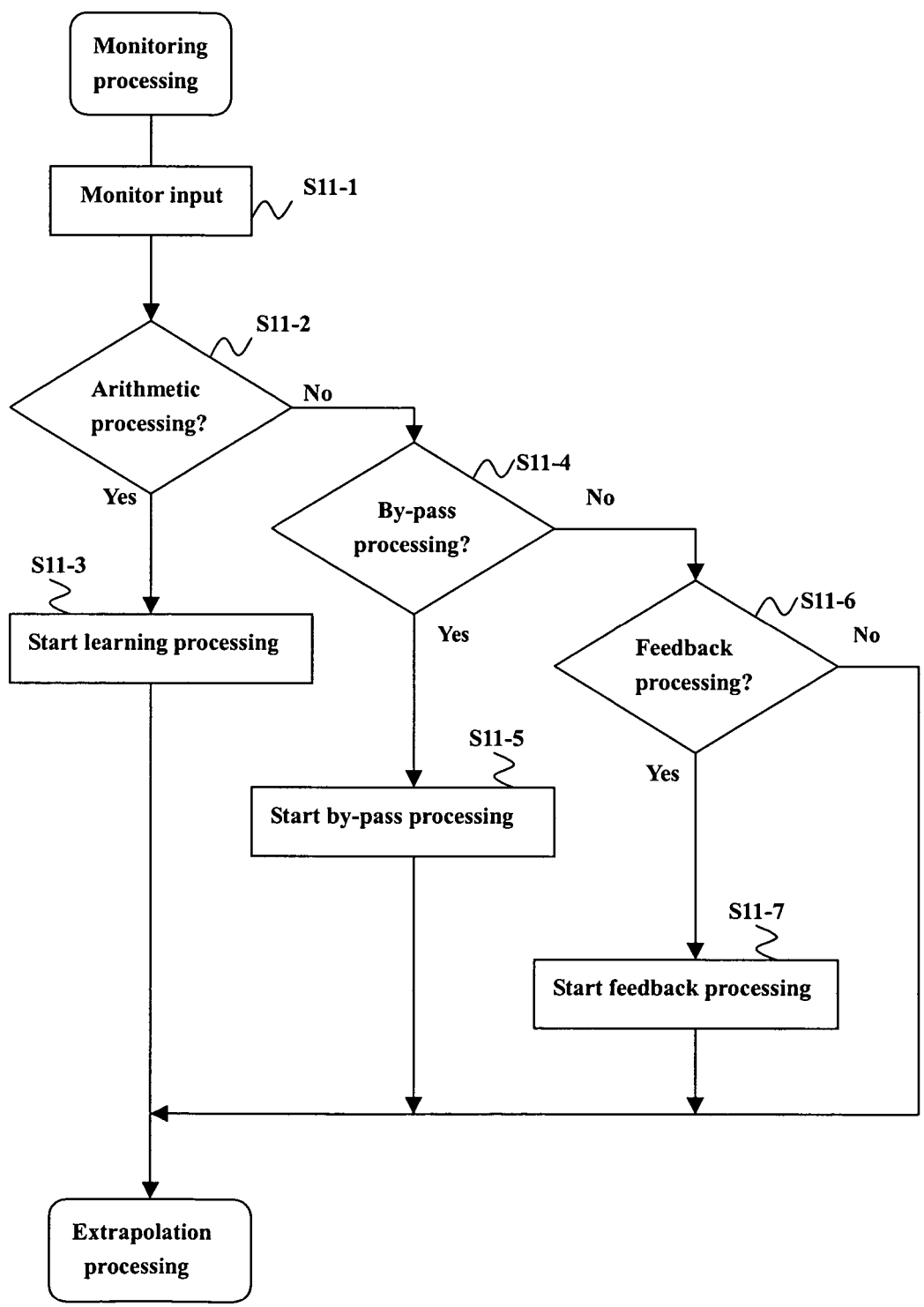

FIG. 17 is the flow diagram of monitoring processing of implementation example 3 of this invention.

Figure 18:
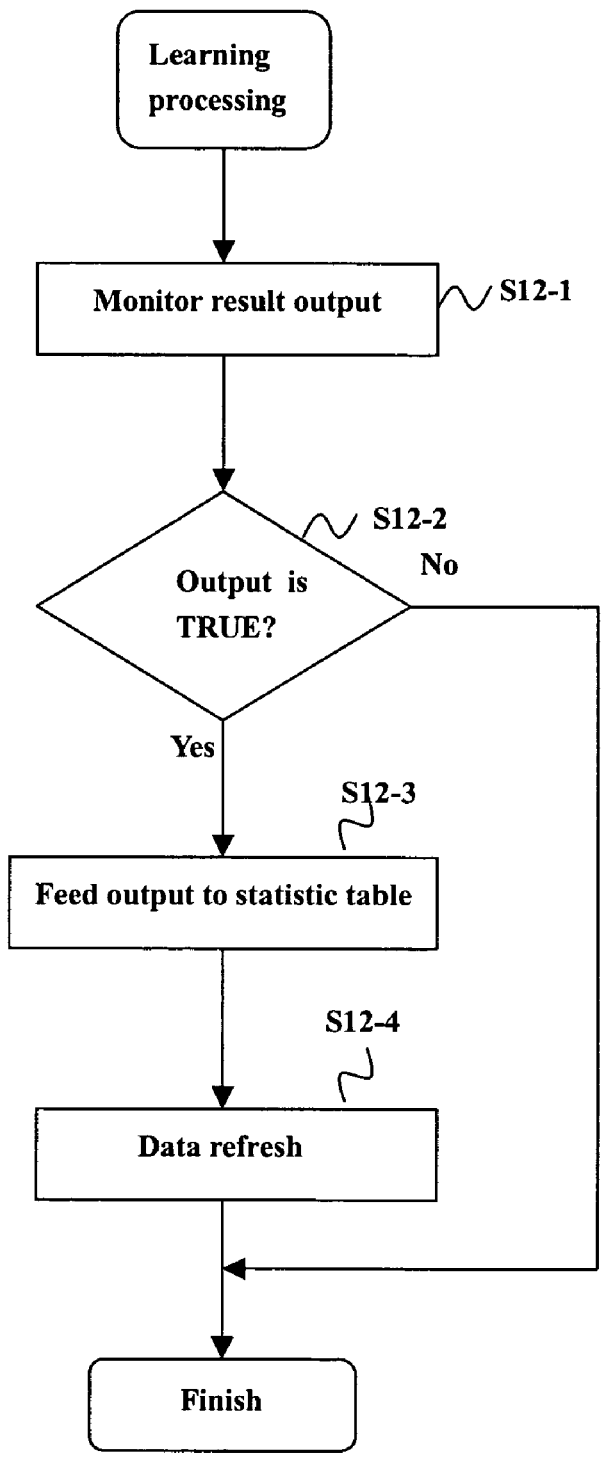

FIG. 18 is the flow diagram of learning processing of implementation example 3 of this invention.

Figure 19:
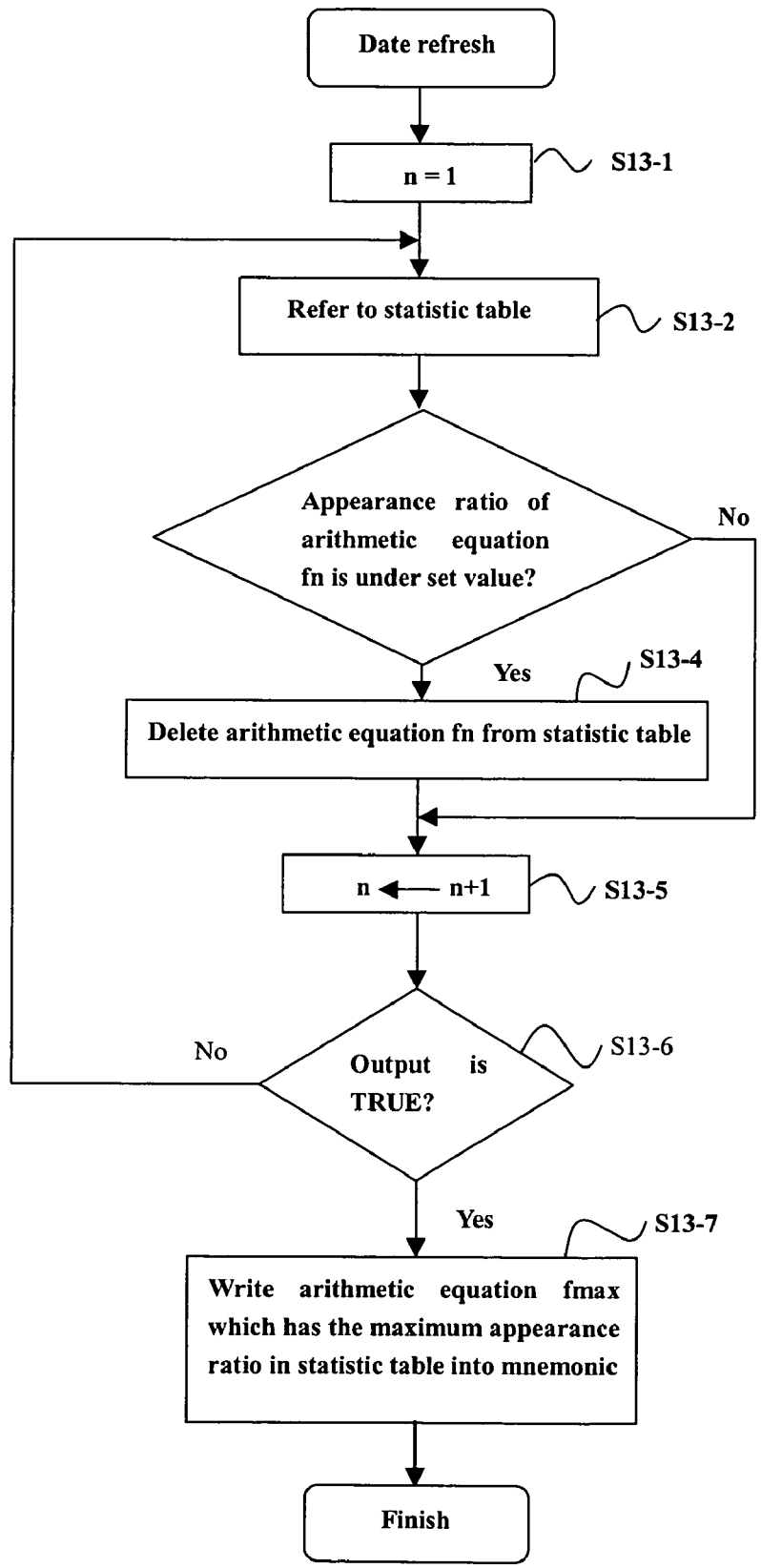

FIG. 19 is the flow diagram of data refresh processing of implementation example 3 of this invention.

Figure 20:
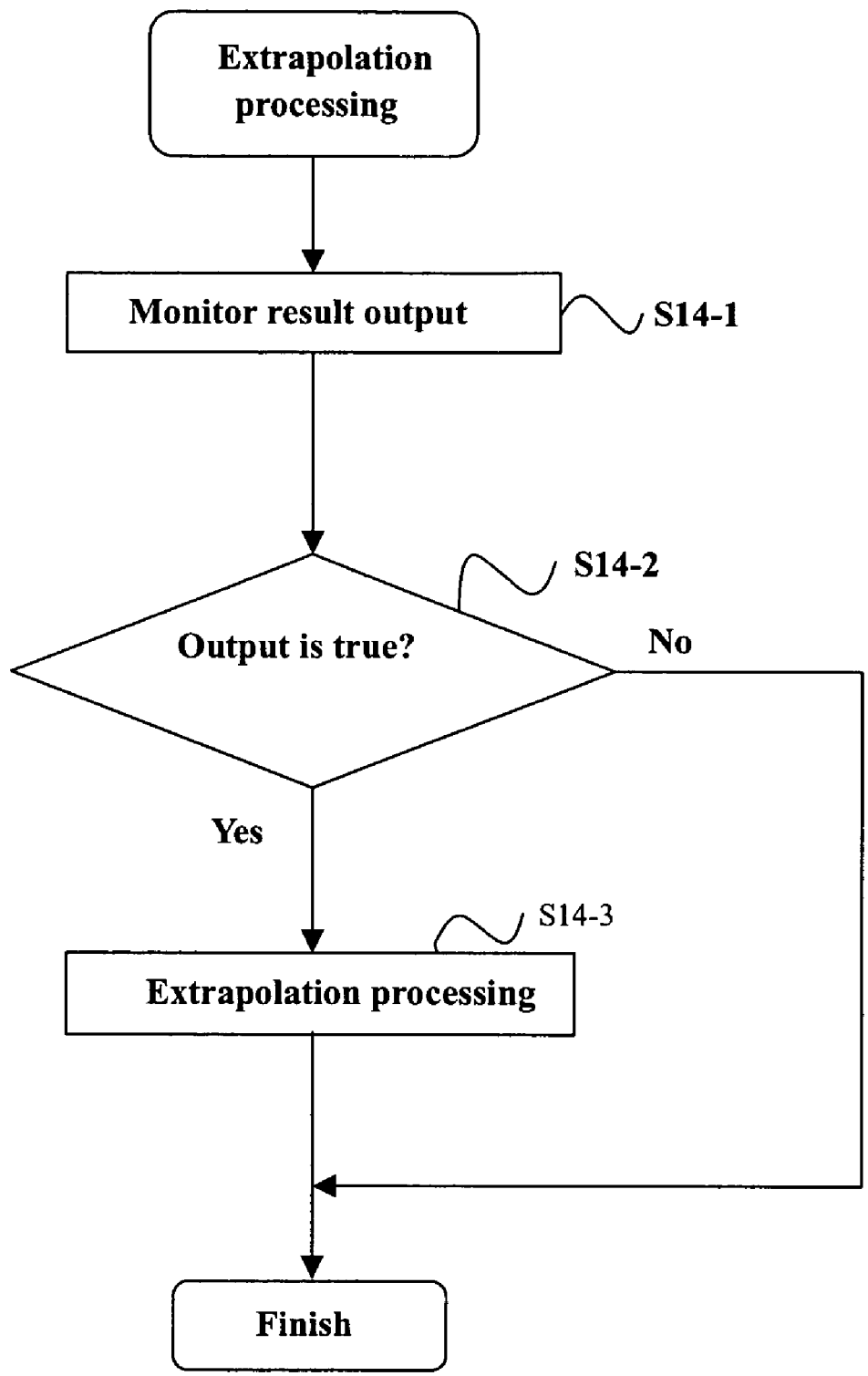

FIG. 20 is the flow diagram of extrapolation processing of implementation example 3 of this invention.

Figure 21:
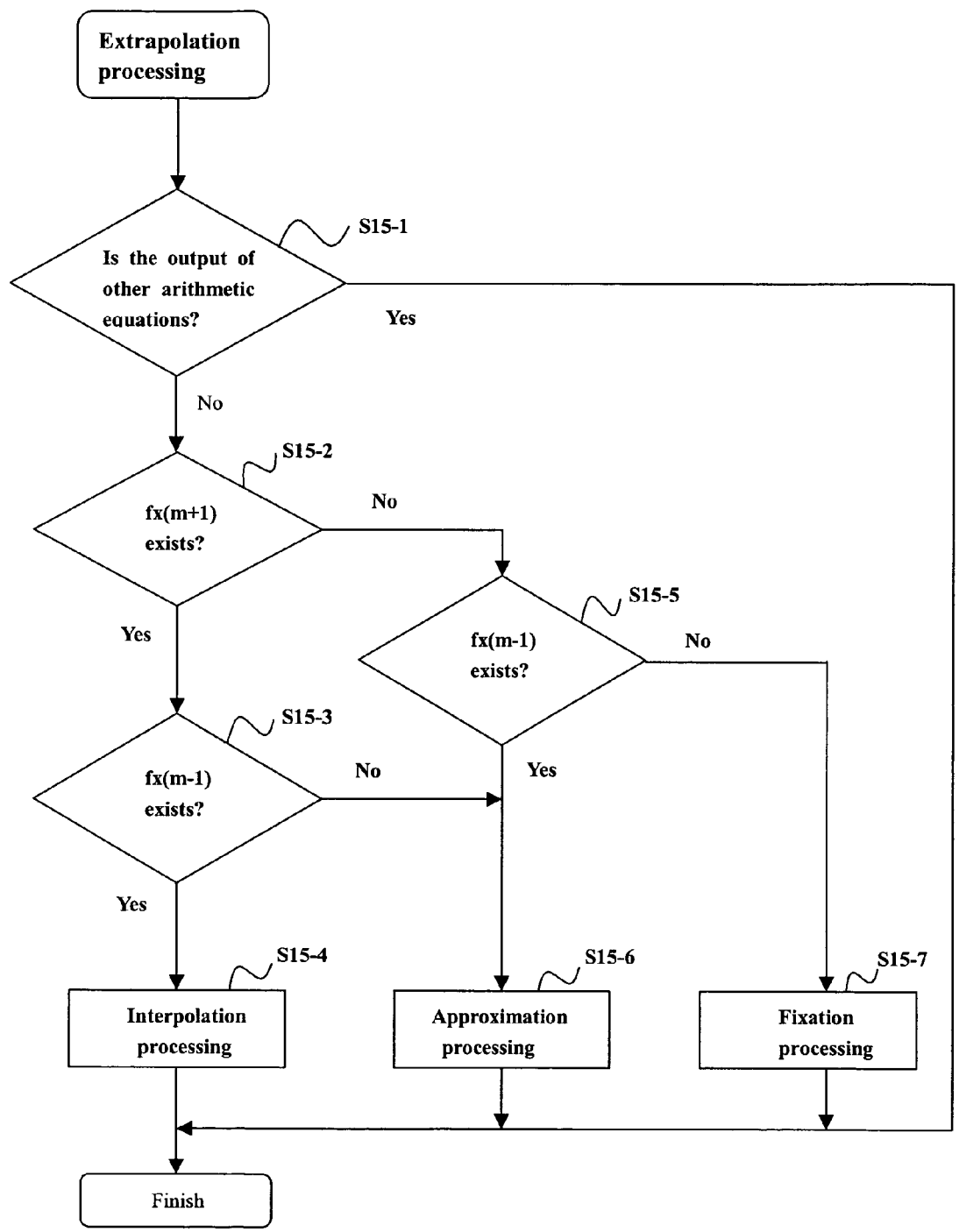

FIG. 21 is the flow diagram of extrapolation processing of implementation example 3 of this invention.

Figure 22:
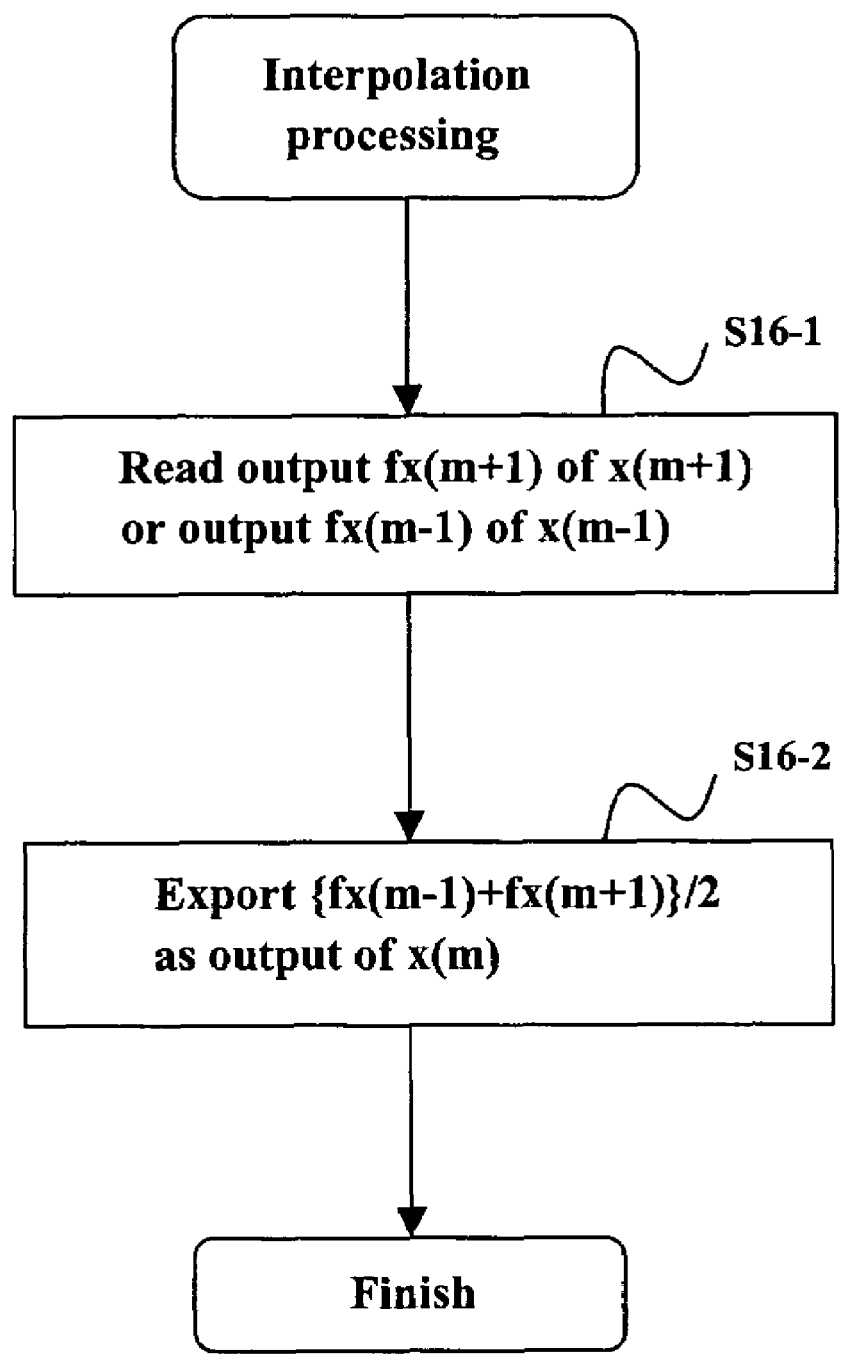

FIG. 22 is the flow diagram of interpolation processing of implementation example 3 of this invention.

Figure 23:
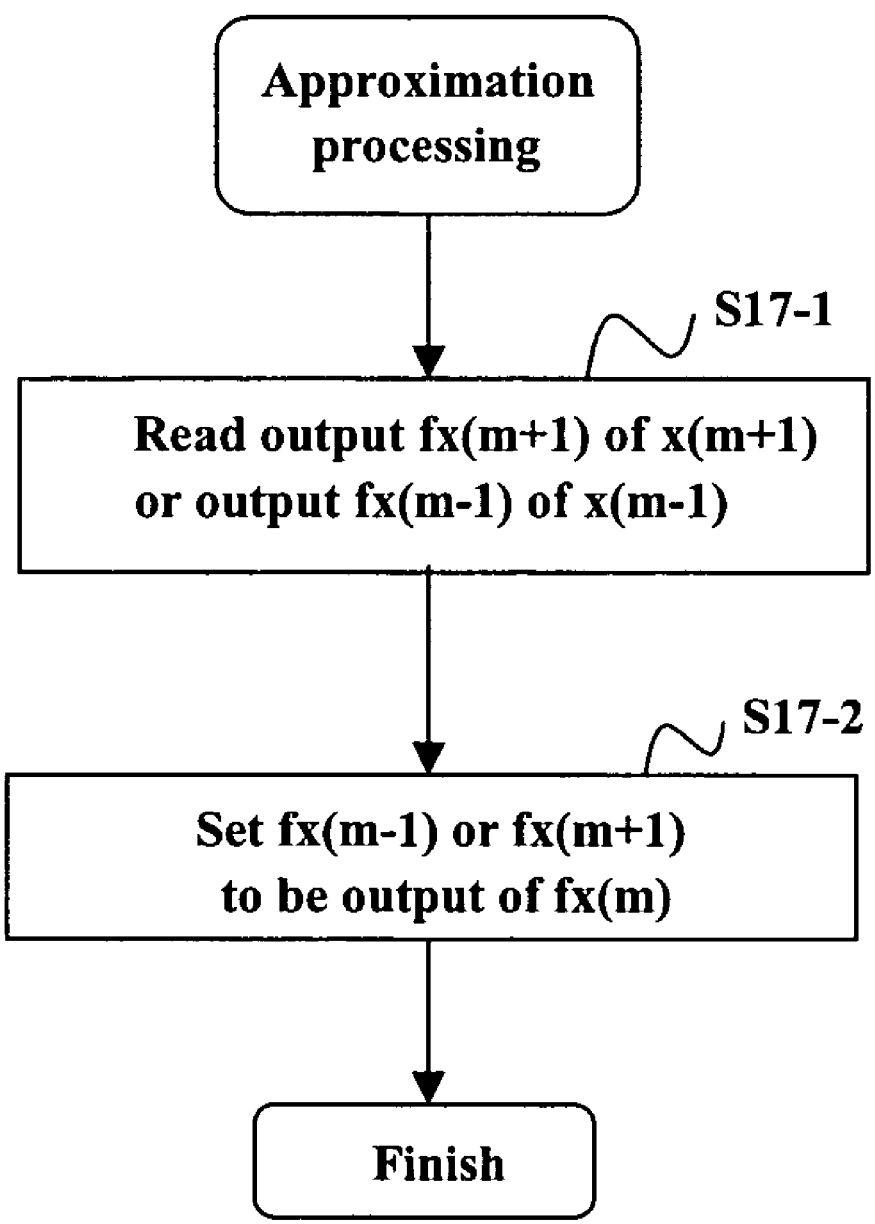

FIG. 23 is the flow diagram of approximation processing of implementation example 3 of this invention.

Figure 24:
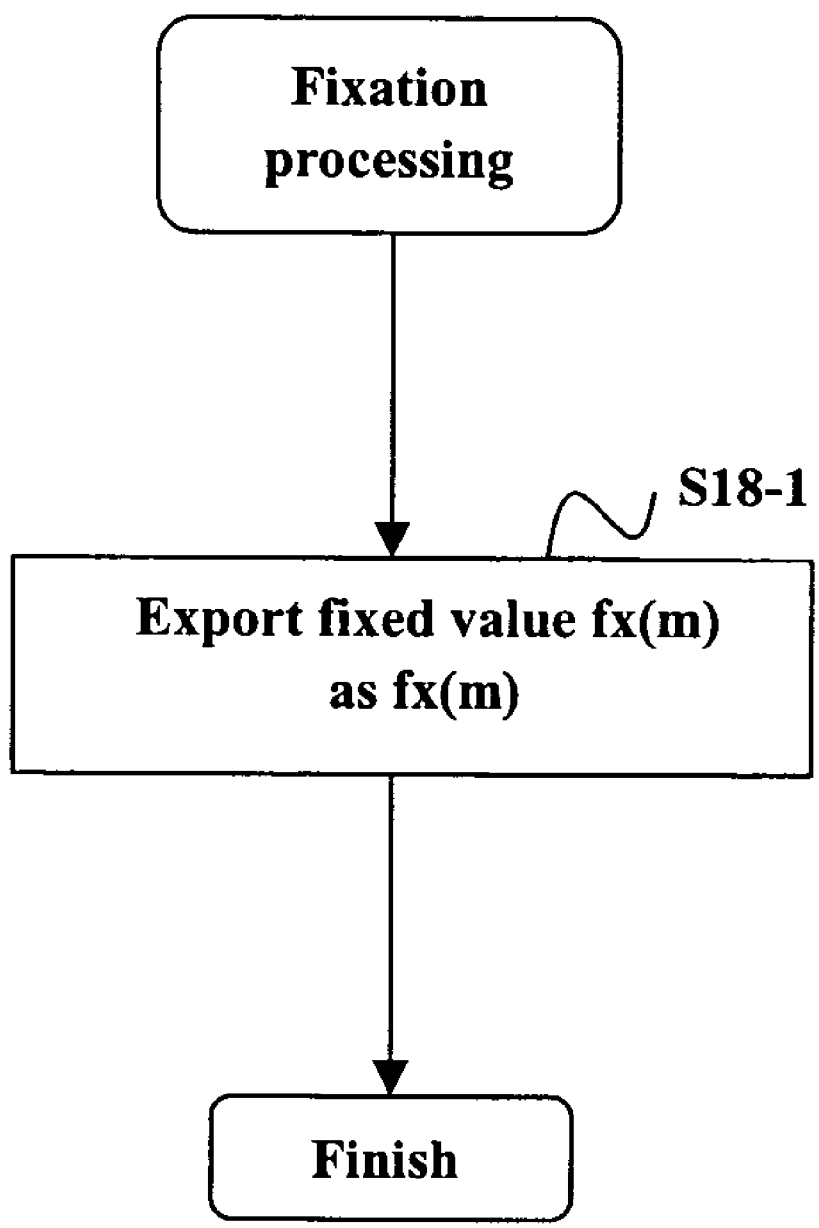

FIG. 24 is the flow diagram of fixation processing of implementation example 3 of this invention.

Figure 25:
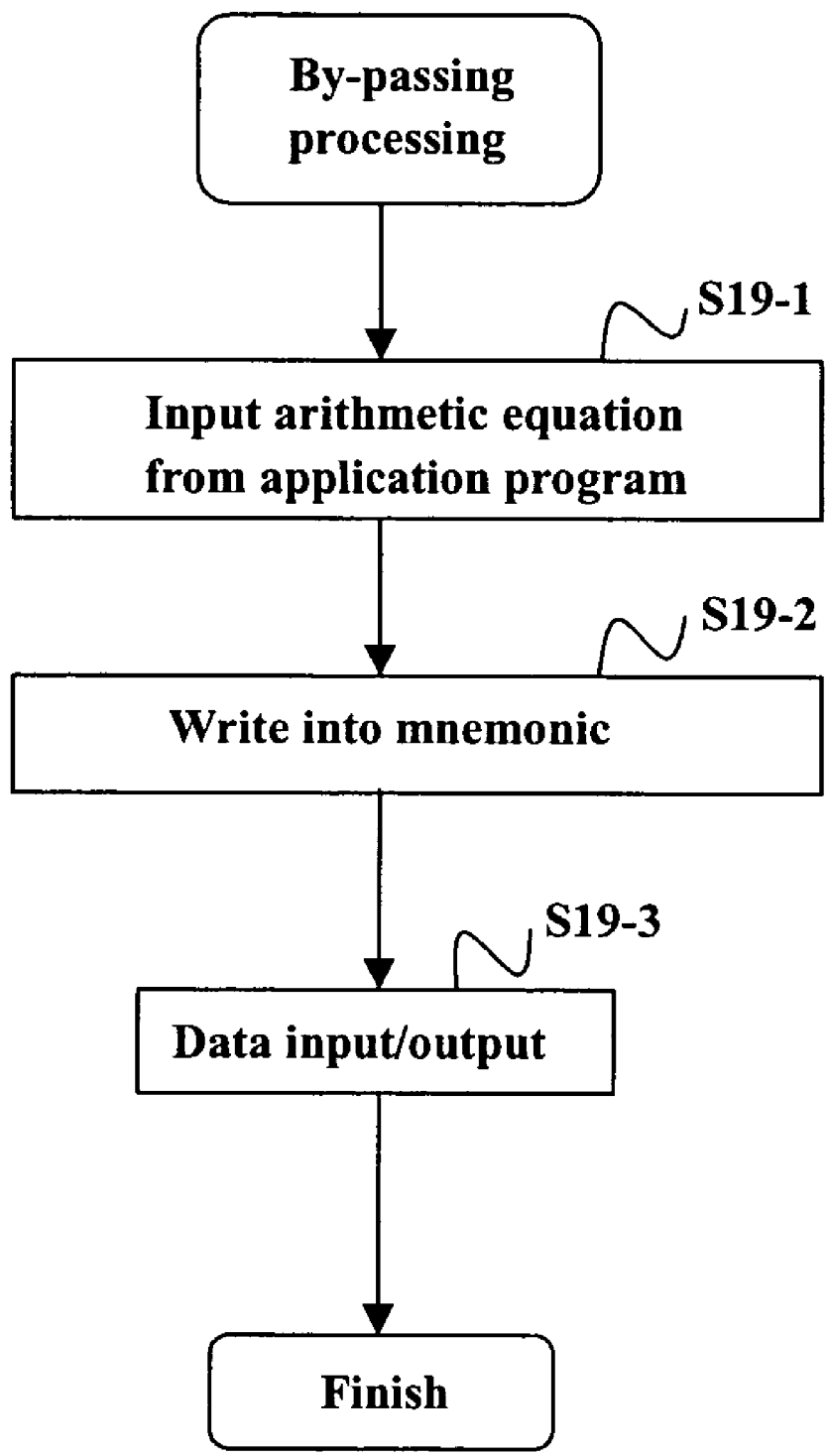

FIG. 25 is the flow diagram of by-pass processing of implementation example 3 of this invention.

Figure 26:
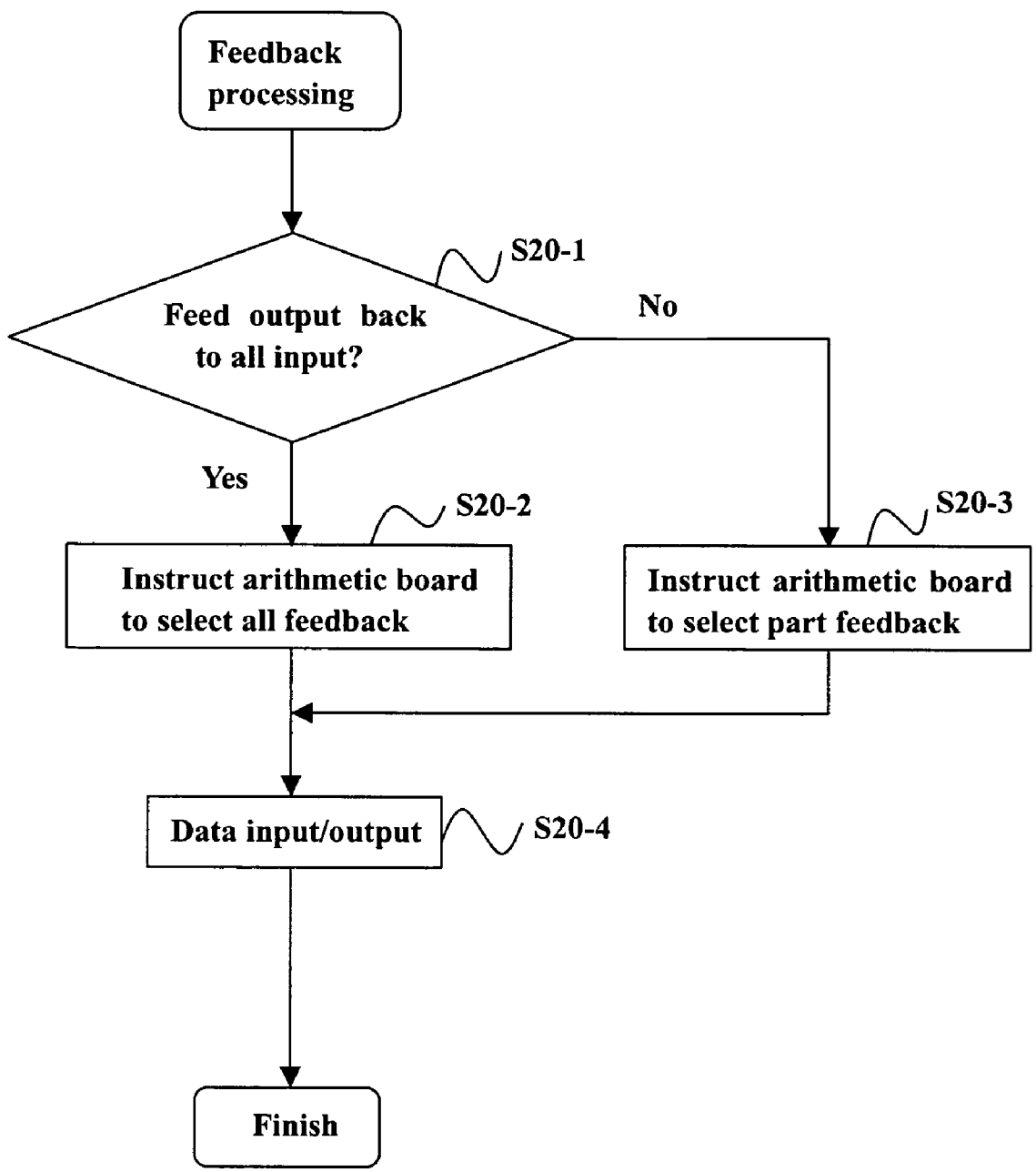

FIG. 26 is the flow diagram of feedback processing of implementation example 3 of this invention.

Figure 27:
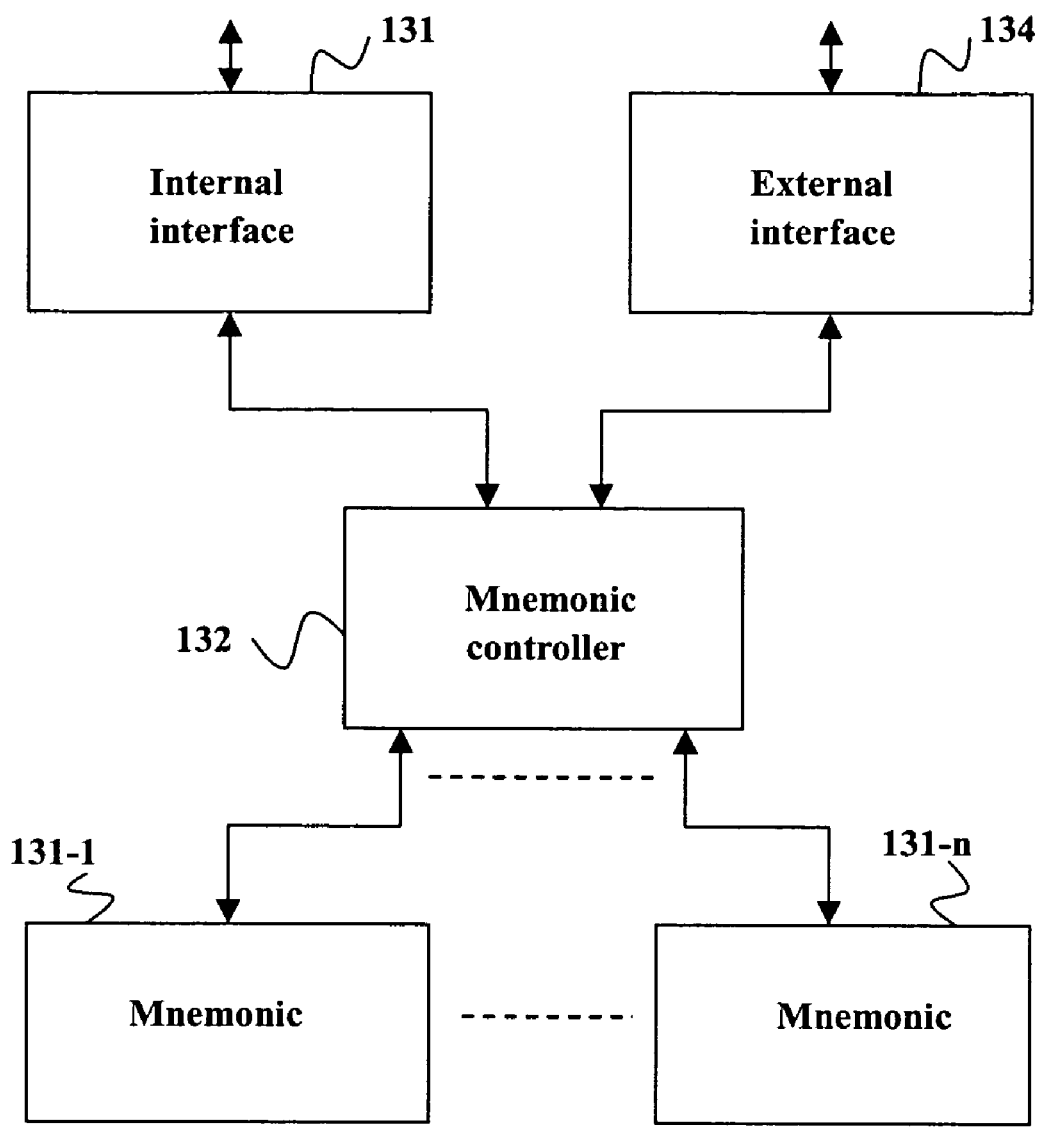

FIG. 27 is the block diagram of modified example of arithmetic board of implementation example 3 of this invention.

Figure 28:
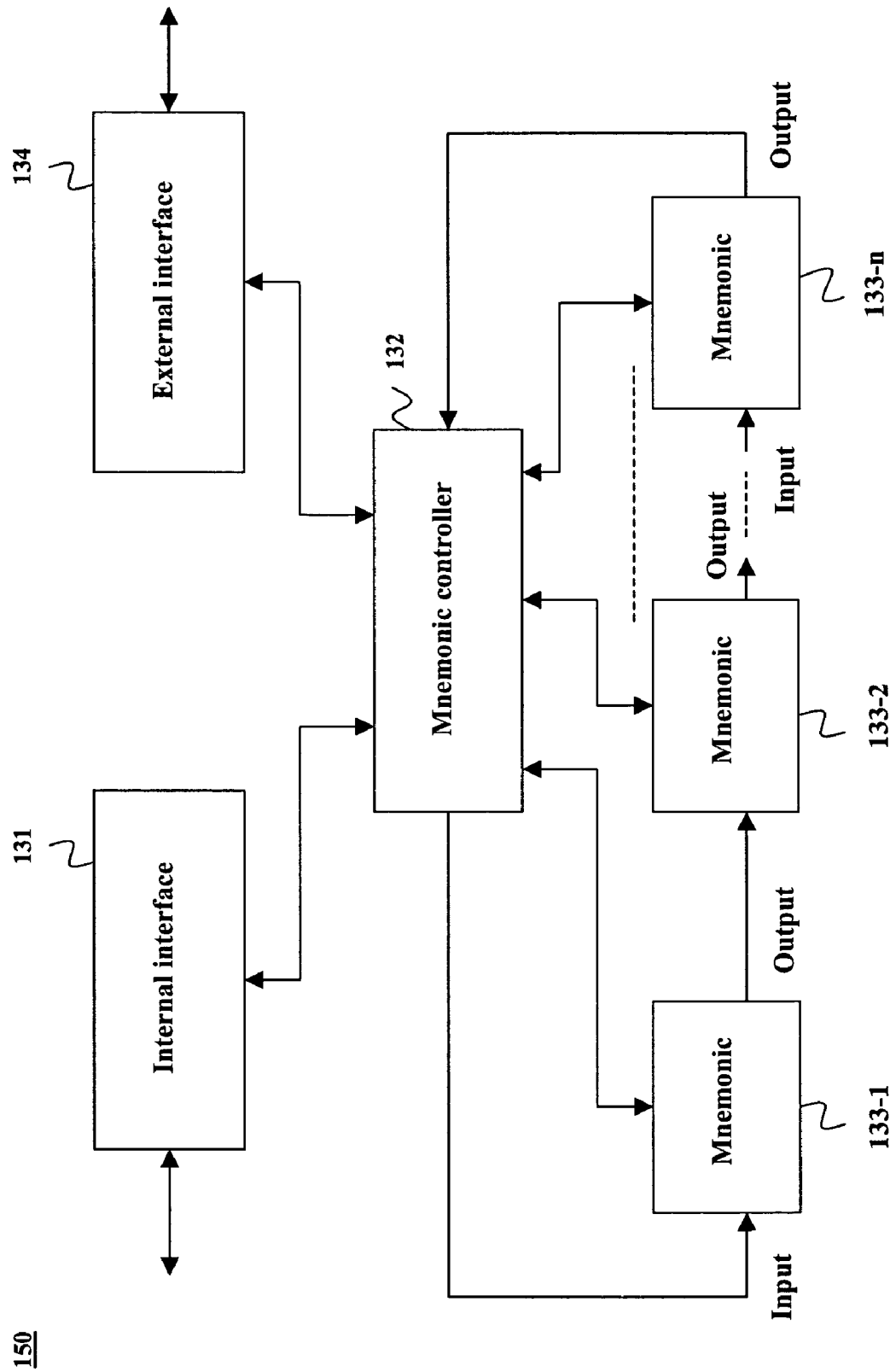

FIG. 28 is the block diagram of other modified example of arithmetic board of implementation example 3 of this invention.

PREFERABLE IMPLEMENTAION EXAMPLE OF THIS INVENTION

Figure 1:
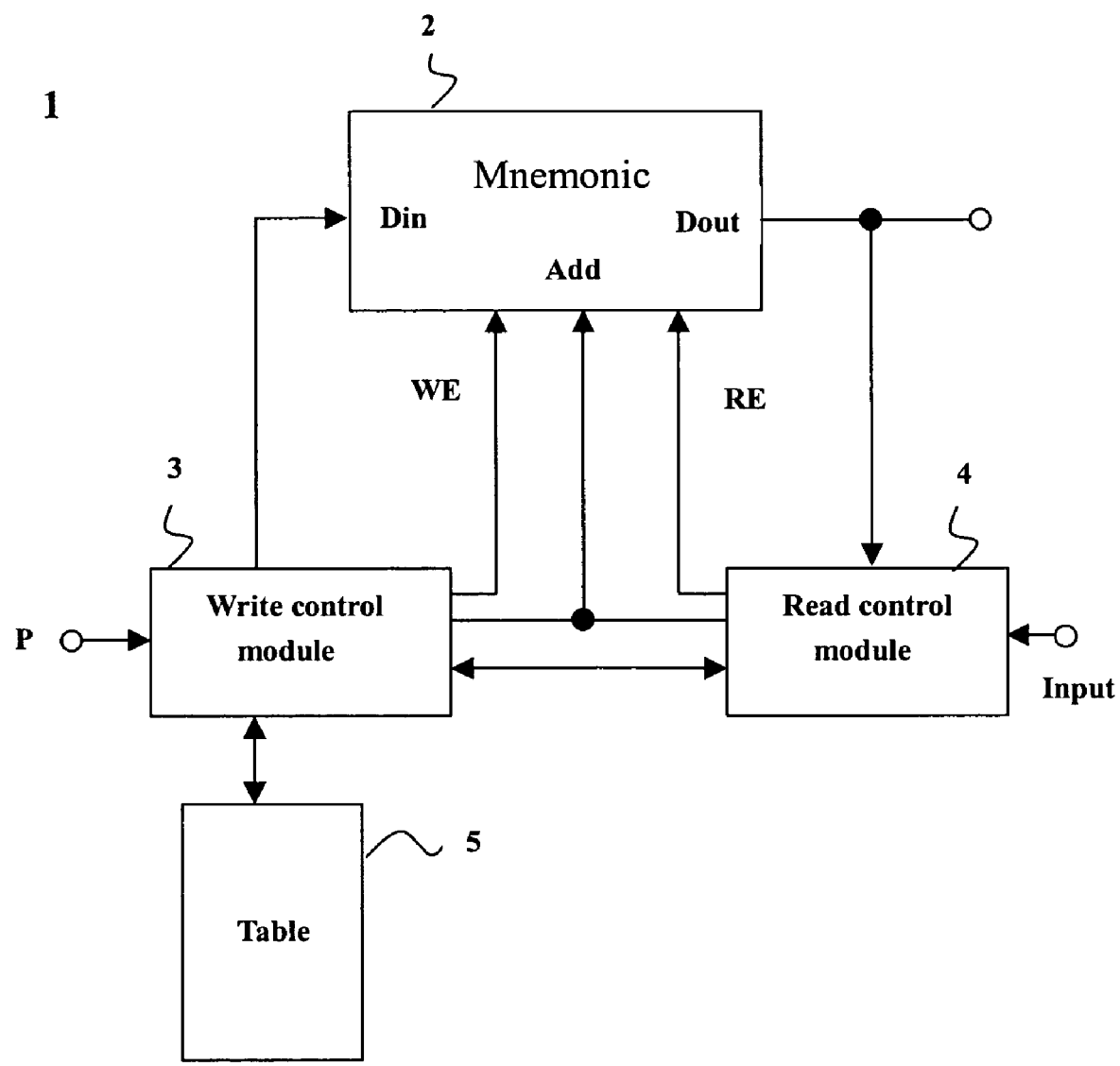
FIG. 1 is the block diagram of implementation example 1 of this invention.

FIG. 1 is the block diagram of implementation example 1 of this invention.

Arithmetic device 1 of this implementation example consists of mnemonic 2, write control module 3, read control module 4 and table 5. Arithmetic device 1 of this implementation example sends out reconfiguration instruction every time arithmetic device 1 has input, and mnemonic 2 remaps according to table 5. At this time, to suppress reconfiguration instruction according to input through write control module 3 and read control module 4 can inhibit remap.

Mnemonic 2 is composed of free read/write mnemonic. Mnemonic 2 writes arithmetic result through write control module 3, and reads the stored arithmetic result through read control module 4.

According to instructions of read control module 4, write control module 3 reads out arithmetic result from table 5 and stores in mnemonic 2.

Equation input is fed to read control module 4 through input end Tin. Input is fed to read control module 4 as address of mnemonic 2. Mnemonic 2 reads out the data corresponding to address of read control module 4 as arithmetic result.

In addition, write control module 3 and read control module 4 are composed of programs and are stored in computer where arithmetic device of this implementation example is installed. Besides, table 5 is formed in permanent storage.

Here, explain the input in detail.

Figure 2:
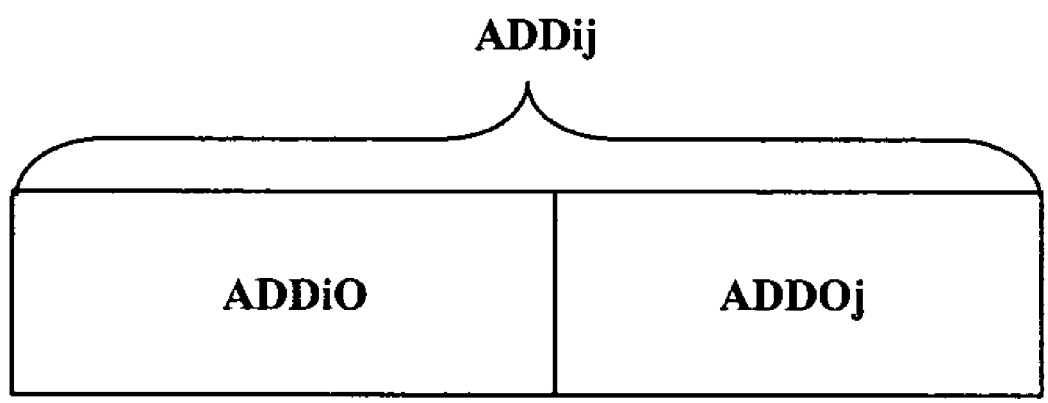
FIG. 2 is the input structure of implementation example 1 of this invention.

FIG. 2 is the input structure of implementation example 1 of this invention.

Input is the same as address of mnemonic 2. Input consists of upper address $ADDi0$ and lower address $ADD0j$. Read control module 4 feeds input lower address $ADD0j$ as address to mnemonic 2. Besides, read control module 4 controls write control module 3 according to upper address $ADDi0$.

According to instructions of write control module 3, write control module 3, from table 5, reads out the data in memory block Ai corresponding to upper address $ADDi0$ and writes into mnemonic 2.

Here, explain data structure of table 5 in detail.

Figure 3:
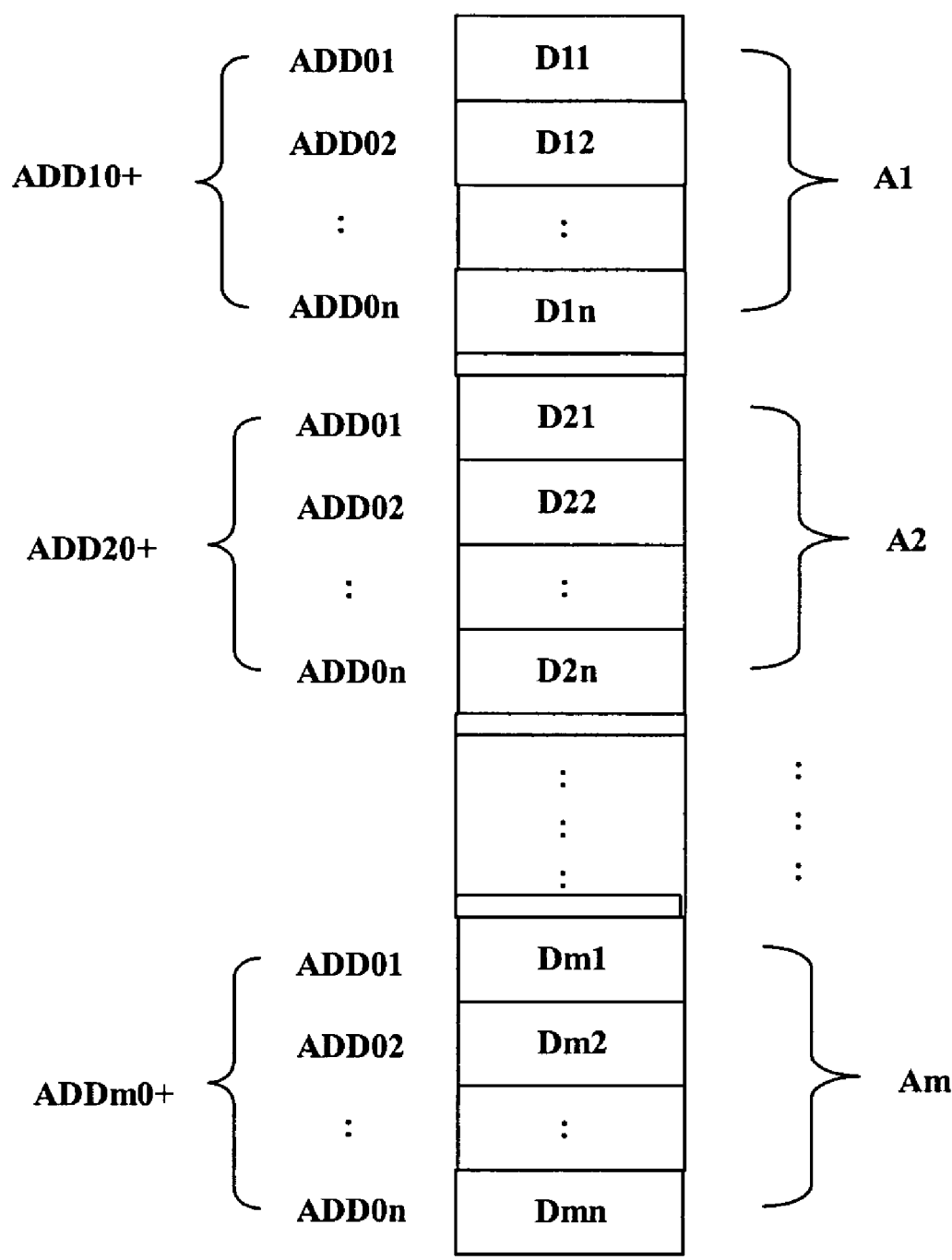
FIG. 3 is table data structure of implementation example 1 of this invention.

FIG. 3 is table data structure of implementation example 1 of this invention.

Table 5 consists of m memory blocks A1~Am. Among blocks A1~Am, Ai has the same data capacity as mnemonic 2.

In memory block A1 are stored n data $D1l$~$D1n$ corresponding to upper address $ADD10$. In memory block A2 are stored n data $D2l$~$D2n$ corresponding to upper address $ADD20$. Likewise, data are stored in each memory block till memory block Am.

Data $D1l$-$D1n$, $D2l$-$D2n$, ... Dml-Dmn stored in table 5 are the arithmetic results of arithmetic equation with respective input and are stored after prior arithmetic.

Among data $D1l$-$D1n$, $D2l$-$D2n$, ... Dml-Dmn stored in table 5, data Dil-Din in memory block Ai are stored in mnemonic 2.

Next, explain data structure of mnemonic 2 in detail.

FIG. 4 is mnemonic data structure of implementation example 1 of this invention.

Mnemonic 2 stores data Dil-Din at address $ADD0l$~$ADD0n$. Mnemonic 2 stores data according to the lower address $ADD0j$ fed by read control module 4.

Next, explain the actions of read control module 4 in detail.

Figure 5:
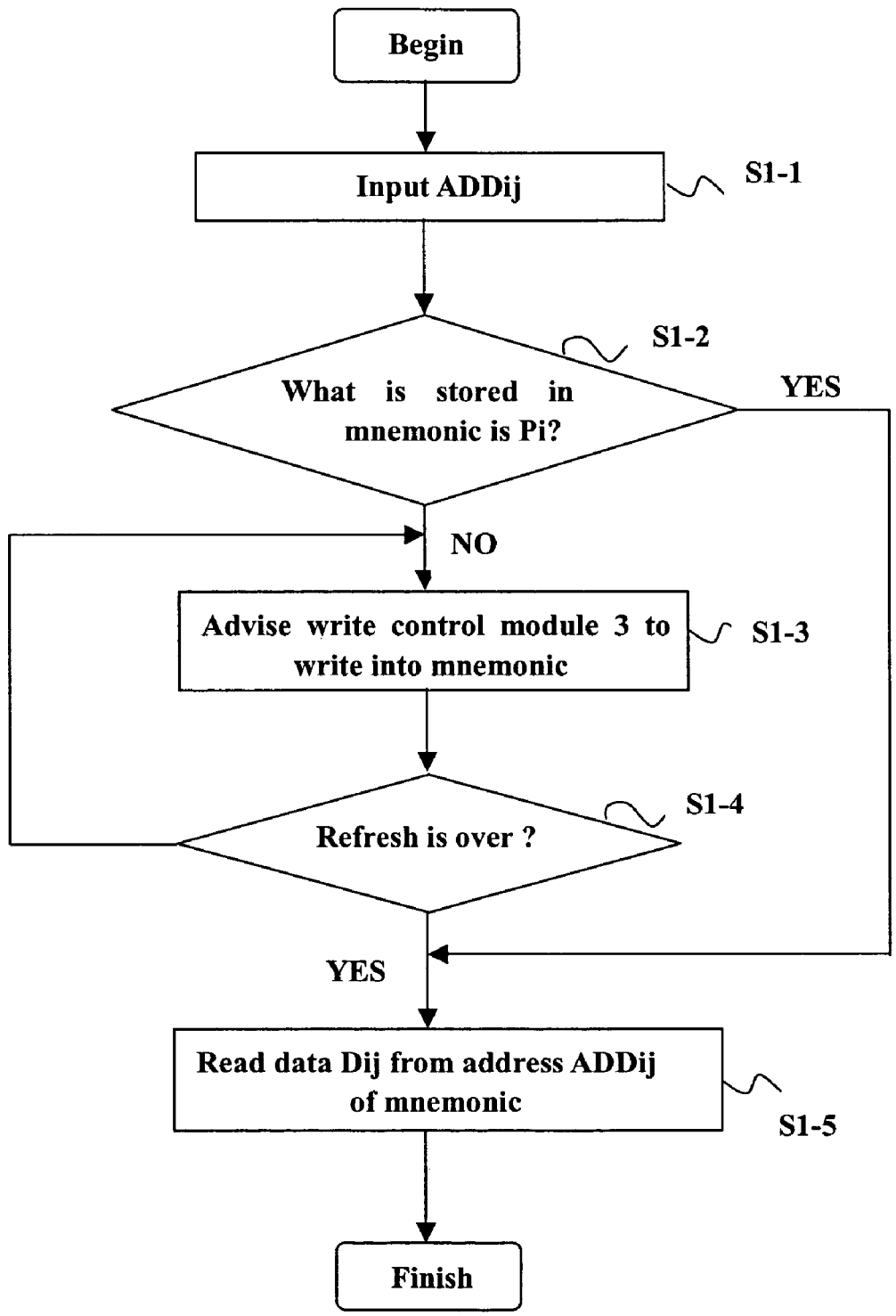
FIG. 5 is the processing flow diagram of read control module of implementation example 1 of this invention.

FIG. 5 is the processing flow diagram of read control module of implementation example 1 of this invention.

Read control module 4 feeds input ADDij through input end Tin at step S1-1, and at step S1-2, checks whether data Dij stored in mnemonic 2 is just the data requested by input ADDij.

If data stored in mnemonic 2 is just the data requested by input ADDij at step S1-2, then at step S1-5, data $D0j$ stored in mnemonic 2 at address $ADD\ 0j$ are read out. If the data requested by input ADD(–) don't exist in data stored in mnemonic 2 at step S1-2, then at step S1-3, write control module 3 is instructed to write the data string including Dij requested by input ADDij into mnemonic 2. According to instructions of read control module 4, write control module 3 writes the requested data string into mnemonic 2 from table 5 as explained below. After write control module 3 refreshes the data string of mnemonic 2, message of refresh finished is fed to read control module 4.

Step S1-4 is to check whether data in mnemonic 2 have been refreshed. According to message of write control module 3, if it is determined that the data in mnemonic 2 have been refreshed at step S1-4, then at step S1-5, data $D0j$ stored in mnemonic 2 at address $ADD0j$ are read out.

Through the above procedure, the arithmetic results of requested input are acquired.

Next, explain the actions of write control module 3 in detail.

Figure 6:
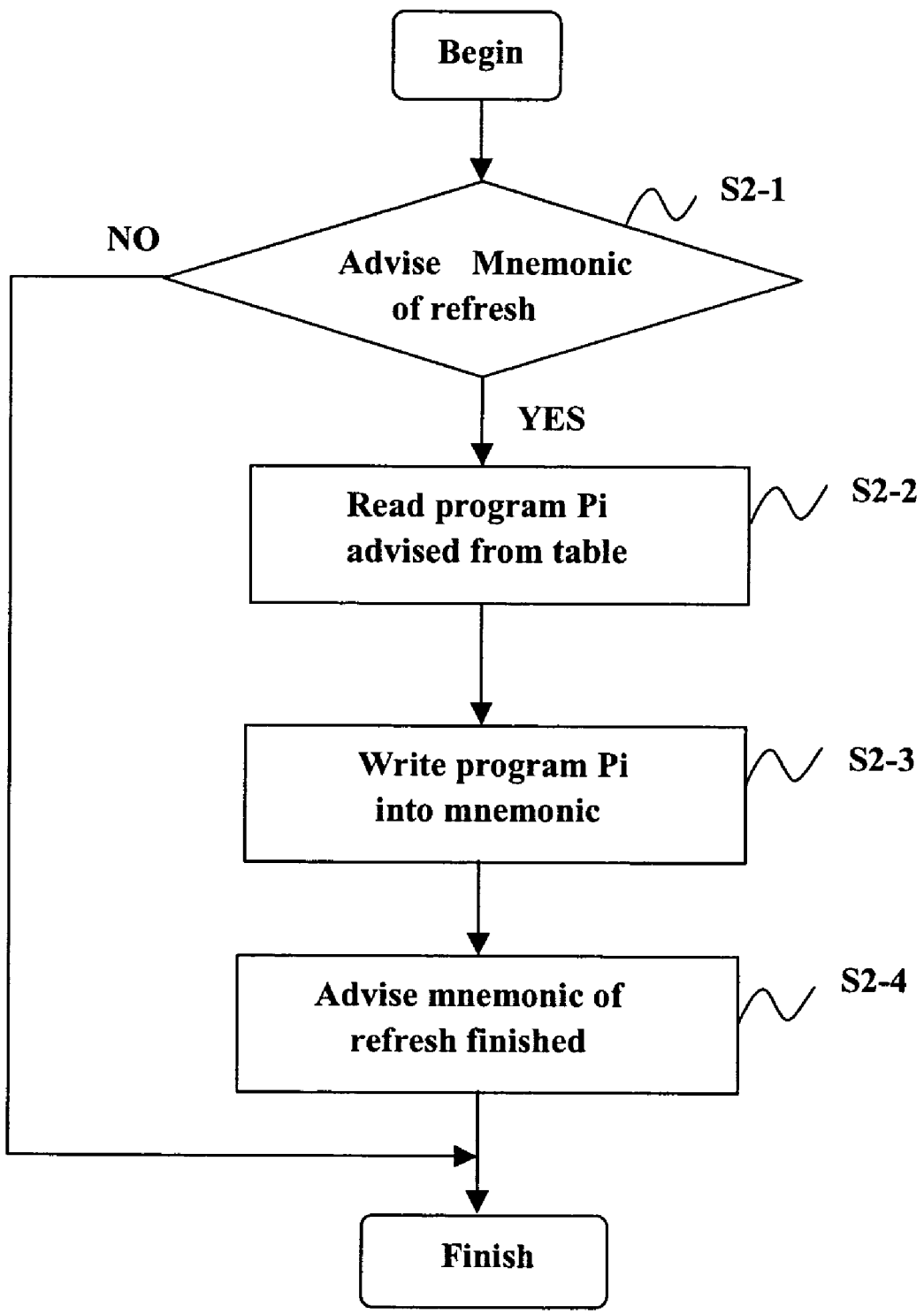
FIG. 6 is the processing flow diagram of write control module of implementation example 1 of this invention.

FIG. 6 is the processing flow diagram of write control module of implementation example 1 of this invention.

At step S2-1, write control module 3 checks whether read control module 4 sends out refresh instruction; if no refresh instruction, end up processing directly.

Besides, if read control module 4 sends out refresh instruction at step S2-1, then at step S2-2, reads out from table 5 the data string corresponding to upper address $ADDi0$ of read control module 4 message and at step S2-3, stores into mnemonic 2. After write control module 3 writes the data into mnemonic 2, message of refresh finished is fed to read control module 4.

Through the above procedure, the data string corresponding to input ADDij are wrote into mnemonic 2.

Through the above procedure, write the data string corresponding to input ADDij into mnemonic 2.

In addition, check up FALSE and TRUE of arithmetic result. When arithmetic result is FALSE, read out from table 5 next data string and store into mnemonic 2.

Here, explain the application example of this implementation example.

FIG. 7 explains the application example of implementation example 1 of this invention.

This is an application example of arithmetic executed by M programs P1-PM with arithmetic device 1 of this implementation example.

Program P1 performance is applied after mnemonic 2 stores arithmetic result of program P1. Program P2 performance is applied after mnemonic 2 stores arithmetic result of program P2. Likewise, program PM performance is applied after mnemonic 2 stores arithmetic result of program PM.

In addition, use a mnemonic system to get arithmetic result in this implementation example; it is also feasible to use multiple systems.

Besides, data stored in mnemonic 2 are refreshed according to input in this implementation example; it is also feasible to give priority to assigning arithmetic result of the most used arithmetic equation to mnemonic 2 after arithmetic result is output statistically. This structure may reduce data shifting of mnemonic 2 to the least. In addition, write control module 5 and table 5 may be deleted, arithmetic result of the most used arithmetic equation may be only stored in mnemonic 2 in advance, and other arithmetic equations are to be processed by programs and CPU. This structure may execute efficient arithmetic with small memory capacity.

FIG. 8 is the block diagram of implementation example 2 of this invention. Assign the same symbols to the same parts as FIG. 1, leaving out explanation.

Arithmetic device 10 of this implementation example consists of N mnemonics 2-1~2-N, write control module 11, read control module 12 and table 5.

Write control module 11 controls data write into N mnemonics 2-1~2-N.

Read control module 12 reads out arithmetic result from N mnemonics 2-1~2-N according to input.

FIG. 9 explains the application example of implementation example 2 of this invention.

In this implementation example, arithmetic result of program P1 is wrote into mnemonic 2-1, arithmetic result of program P2 is wrote into mnemonic 2-2. Likewise, arithmetic result of program PN is wrote into mnemonic 2-N.

Arithmetic result is exported from mnemonic 2-1 in program P1 application, arithmetic result is exported from mnemonic 2-2 in program P1 application. Likewise, arithmetic result is exported from mnemonic 2-N in program PN application.

Thus, N programs P1-PN can be executed without refreshing data in mnemonics 2-1~2-N. Therefore, time need not be changed and execution can be high-speed.

Accoding to this implementation example, arithmetic results can be exported in parallel when multiple programs are applied.

In addition, data stored in mnemonic are acquired by table in the above implementation examples 1 and 2. Yet it is also feasible to write arithmetic result into mnemonic after mnemonic data are calculated by CPU in turn, thus table can be omitted.

In addition, here explain the application examples of arithmetic devices 1 and 10 of implementation example 1 and 2.

Figure 10:
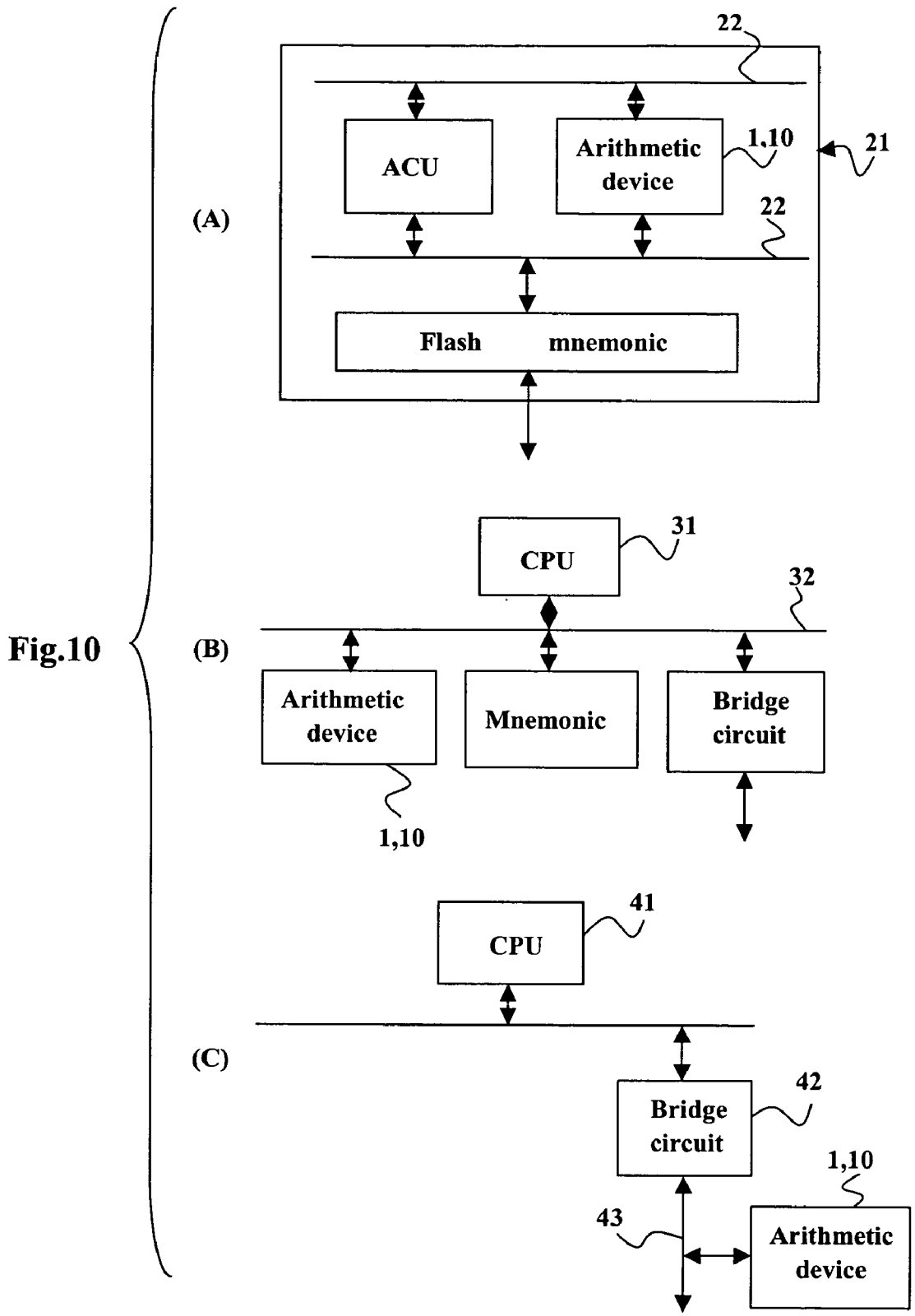

FIG. 10 is the block diagram of application examples of this invention. FIG. 10(A) is the application example included in CPU, FIG. 10(B) is the application example connecting with mnemonic collecting bar, and FIG. 10(C) is the application example connecting with PCI collecting bar.

Arithmetic devices 1 and 10 which can be combined in CPU 21 are demonstrated in FIG. 10(A) and so can directly connect with internal collecting bar 22 in CPU 21, therefore, arithmetic devices 1 and 10 can read/write with high clock and operate with high speed.

Besides, arithmetic devices 1 and 10 may also be composed of wafer different from CPU 31, and connect with mnemonic 32 to operate. With this structure, big area wafer can enlarge memory capacity of mnemonic 2. Therefore, adaptation to arithmetic result can be reduced and arithmetic devices 1 and 10 can operate with high speed.

In addition, it is also feasible to connect arithmetic devices 1 and 10 with PCI collecting bar 43 set by CPU 41 through bridge circuit 42. With this structure, arithmetic devices 1 and 10 can be installed in PC board, which easily adapts to personal computer on market; memory capacity of mnemonic 2 in the form of circuit board can also be enlarged. In addition, explain below how to install them in PCI board in detail.

PCI board which realizes arithmetic device 1 of this implementation example consists of mnemonic and PCI target collecting bar controller. For example, mnemonic is composed of RAM which has 4096-word address space and 12-bit collecting-main-width bus. PCI target collecting bar controller is the interface of PCI collecting bar and mnemonic.

When editing algorithm of PCI board mnemonic, right item(input) of arithmetic equation are set as mnemonic address, and left item(arithmetic results) of arithmetic equation are stored in mnemonic. When executing algorithm, right item(input) of arithmetic equation are fed to mnemonic address, and left item(arithmetic results) of arithmetic equation are exported from mnemonic.

In addition, explain the processing in detail.

For example, explain how to deal with the algorithm below.

Switch(a)

```
{
    case b[0]: y=x[0];
        break;
    case b[1]: y=x[1];
        break;
    case b[2]: y=x[2];
        break;
```
-continued

```
    .
    .
    .
    case b[n]: y=x[n];
        break;
}
```

In this case, mnemonic address An consistent with CASE declaration condition b[n] are edited. In execution, arithmetic result x[n] can be acquired from mnemonic with declaration condition b[n] input at mnemonic address.

With such processing, when dealing with the above CASE declaration of n branches, as long as write declaration condition b[n] is wrote to mnemonic address, arithmetic result x[n] can be exported. Therefore, arithmetic result can be acquired with high speed. Besides, hardware is used together with conditional branches to operate, so responses are fixed and can be processed instantaneously.

As explained above, according to this invention, arithmetic result, through writing input to address, can be exported in no time to accelerate the processing. Besides, to adapt arithmetic result synchronously with the arithmetic may deal with a variety of arithmetic equations with small memory capacity.

Next, explain implementation example 3 of this invention.

FIG. 11 is the block diagram of implementation example 3 of this invention.

Arithmetic device 100 of this implementation example may be realized by personal computer. Arithmetic device 100 consists of driver 102, arithmetic equations table 103, statistic table 104 and arithmetic board 105.

Software driver 102 is installed in personal computer, and operates through personal computer CPU. Driver 102 operates according to input of application program 111.

FIG. 12 is driver functional block diagram of implementation example 3 of this invention.

Driver 102 consists of monitoring processing 121, learning processing 122, extrapolation processing 123, by-pass processing 124 and feedback processing 125.

Monitoring processing 121 is to monitor the input of application program 111. Learning processing 122 is to make arithmetic board 105 store arithmetic equation through learning. Extrapolation processing 123 is to extrapolate the output when output corresponding to input doesn't exist. By-pass processing 124 is to make arithmetic board 105 store arithmetic equation through application program 111. Feedback processing 125 is to make arithmetic board 105 export feedback to input.

Access to arithmetic board 105 according to input of arithmetic board 105. Output are acquired from arithmetic board 105 and then are fed to application program 111. Besides, driver 102 fabricates statistic table 104 according to input of arithmetic board 105, and makes arithmetic board 105 store data in arithmetic equations table 103 according to statistic table 104.

As for multiple arithmetic equations f1~fn, arithmetic equations table 103 stores respective output corresponding to input.

FIG. 13 is the data structure of arithmetic equation table of implementation example 3 of this invention.

Statistic table 104 is to manage the respective appearance ratio of multiple arithmetic equations f1~fn.

Arithmetic equations table 103 is shown in FIG. 12, it stores output d1~dm corresponding to input A1~Am as to multiple arithmetic equations f1~fn.

Statistic table 104 manages the appearance frequencies e1~en of multiple arithmetic equations f1~fn. Appearance frequencies e1~en are corresponding to appearance times of arithmetic equations f1~fn, being added [1] after every arithmetic. In addition, add the result multiplied by coefficients [0.5] or [0.4] to rarely used arithmetic equations. Besides, add the result multiplied by coefficients [1.5] or [1.4] to frequently used arithmetic equations or important arithmetic equations.

For example, arithmetic board 105 is a device which connects PCI collecting bar, ISA collecting bar, USB and PCM-CIA card port of personal computer, and exports the arithmetic result of requested arithmetic equation according to input of driver 102.

FIG. 15 is the block diagram of arithmetic board of implementation example 3 of this invention.

Arithmetic board 105 consists of internal interface 131, mnemonic controller 132, mnemonic 133 and external interface 134. Internal interface 131 is the interface of the above collecting bars of personal computer. Mnemonic controller 132 controls data read/write of mnemonic 133 according to instructions from internal interface 131. Mnemonic 133 stores the data of arithmetic equation fx among multiple arithmetic equations f1~fn stored in arithmetic equations table 103. Besides, mnemonic 133 sets input of application program 111 as address, and reads out data according to input at the set address.

FIG. 16 is mnemonic data structure of implementation example 3 of this invention.

Mnemonic 133 is shown in FIG. 16, it stores data d1~dm at address A1~Am. Address A1~Am are corresponding to input of arithmetic equation fx, and stored data d1~dm are corresponding to output of arithmetic equation fx External interface is the interface of external devices.

Next, explain the actions of driver 102 in detail.

Firstly, explain monitoring processing 121 of driver 102.

FIG. 17 is the flow diagram of monitoring processing of implementation example 3 of this invention.

Monitoring processing 121 includes steps S11-1~S11-3.

Step S11-1 is to monitor input of application program 111. Step S11-2 is to check whether input of application program 111 is the requested input by arithmetic.

At step S11-2, step S11-3 is executed if input of application program 111 is just the requested input by arithmetic. Step S11-3 is to start learning processing 122 and extrapolation processing 123.

Besides, at step S11-2, step S11-4 is executed if input of application program 111 is not the requested input by arithmetic.

Step S11-4 is to check whether input of application program 111 is the requested input by by-pass processing 124. At step S11-4, step S11-5 is executed if input of application program 111 is just the requested input by by-pass processing 124. Step S11-5 is to start by-pass processing 124.

Besides, at step S11-4, step S11-6 is executed if input of application program 111 is not the requested input by by-pass processing 124. Step S11-6 is to check whether input of application program (–)1 is the requested input by feedback processing 12.

At step S11-6, step S11-7 is executed if input of application program 111 is just the requested input by feedback processing 125. Step S11-7 is to start feedback processing 125.

FIG. 18 is the flow diagram of learning processing of implementation example 3 of this invention.

Learning processing 121 includes steps S12-1~S12-4.

Step S12-1 is to monitor output. Step S12-2 is to check whether monitor result and output of step S12-1 are [TRUE].

At step S12-2, step S12-3 is executed if output of step S12-1 is determined to be [TRUE]. Step S12-3 is to feed output to statistic table 104. For example, when output arithmetic equation according to application program 111 input is as the arithmetic equation fx shown in FIG. 4, appearance ratio dx in FIG. 4 is changed into (dx+1).

Step S12-4 is to refresh data stored in mnemonic 133.

Next, explain data refresh processing.

FIG. 19 is the flow diagram of data refresh processing of implementation example 3 of this invention.

Data refresh processing in step S12-4 includes steps S13-1~S13-7.

Step S13-1 is to set variable n to be [1]. Step S13-2 is to refer to statistic table 104. Step S13-3 is to check whether appearance ratio dn of arithmetic equation fn in statistic table 104 is under set value D.

At step S13-3, step S13-4 is executed if appearance ratio dn is under the set value D, that is, application frequency of arithmetic equation fn is small. Step S13-4 is to delete arithmetic equation fn from statistic table 104.

At step S13-3, step S13-5 is directly executed if appearance ratio dn of arithmetic equation fn is over the set value D. Step S13-5 is to set variable n to be (n+1)

Step S13-6 is to check whether variable n is the prior set constant N. At step S13-6, come back to step S13-2 and repeat steps S13-2~S13-5 if variable n is not the constant N. At step S13-6, step S13-7 is executed if variable n is not the constant N.

Step S13-7 is to write data of arithmetic equation fxmax which has the maximum appearance ratio dx in statistic table 104 into mnemonic 133.

Through the above procedure, the probability of adapting data in mnemonic 133 is greatly reduced when input of application program exists.

Next, explain extrapolation processing 123.

FIG. 20 is the flow diagram of extrapolation processing of implementation example 3 of this invention.

Extrapolation processing 123 includes steps S14-1~S14-3.

Step S14-1 is to monitor output. Step S14-2 is to check whether monitor result and output of step S14-1 are [FALSE]. At step S14-2, step S14-3 is executed if output of S14-1 is determined to be [FALSE]

Step S14-3 is extrapolation processing which extrapolates the output.

Explain the extrapolation processing.

FIG. 21 is the flow diagram of extrapolation processing of implementation example 3 of this invention.

Extrapolation processing includes steps S15-1~S15-7.

Step S15-1 is to check whether is input of other arithmetic equations. Step S15-2 is executed if it is not input of other arithmetic equations.

Step S15-2 is to check whether output fx(m+1) is in mnemonic 133. At step S15-2, step S15-3 is executed if output fx(m+1) is determined to be in mnemonic 133.

Step S15-3 is to check whether output fx(m−1) is in mnemonic 133. At step S15-3 , step S15-4 is executed if output fx(m−1) is determined to be in mnemonic 133, that is, output fx(m+1) and fx(m−1) are determined to be in existence.

Step S15-4 is interpolation processing which interpolates output fx(m+1) and fx(m−1) to acquire output fx(m).

At step S15-2, step S15-5 is executed if output fx(m+1) is determined to be not in existence. Step S15-5 is to check whether output fx(m−1) exists.

At step S15-5, step S15-6 is executed if output fx(m−1) is determined to be in existence, that is, only output fx(m−1) is determined to be in existence. Besides, at step S15-3, step S15-6 is executed if output fx(m−1) is determined to be not in existence, that is, only output fx(m+1) is determined to be in existence.

Step S15-6 is approximation processing which approximately processes output fx(m+1) or fx(m−1) in existence and output fx(m).

At step S15-5, step S15-7 is executed if output fx(m−1) is determined to be not in existence. Step S15-7 is fixation processing which sets output fx(m) as prior fixed output fx(M).

Next, explain interpolation processing in step S15-4.

FIG. 22 is the flow diagram of interpolation processing of implementation example 3 of this invention.

Interpolation processing includes steps S16-1~S16-2.

Step S16-1 is to read output fx(m−1) and fx(m+1) from mnemonic 133. Step S16-2 is to export fx(m) after output fx(m−1) and fx(m+1) are placed in equation (1) below.

$$\{fx(m-1)+fx(m+1)\}/2 \qquad (1)$$

Interpolation processing of this implementation example sets the intermediate value of output fx(m−1) and fx(m+1) to be output fx(m).

Next, explain approximation processing in step S15-6.

FIG. 23 is the flow diagram of approximation processing of implementation example 3 of this invention.

Approximation processing includes steps S17-1 and S17-2.

Step S17-1 is to read output fx(m−1) or fx(m+1) from mnemonic 133. Step S17-2 is to export output fx(m−1) or fx(m+1) as output of fx(m).

Next, explain fixation processing in step S15-7.

FIG. 24 is the flow diagram of fixation processing of implementation example 3 of this invention.

Fixation processing includes steps S18-1.

Step S18-1 is to set the prior constant x(M) to be output fx(m), which may fix output fx(m).

Next, explain by-pass processing 124.

By-pass processing 124 is to by-pass learning processing 23 and directly write arithmetic equation fA of application program 111 into mnemonic 133.

FIG. 25 is the flow diagram of by-pass processing of implementation example 3 of this invention.

By-pass processing includes steps S19-1~S19-3.

Step S19-1 is to write arithmetic equation fA from application program 111. Step S19-2 is to write arithmetic equation fA from application program 111 into mnemonic 133.

Step S19-3 is to write data of application program 111 into mnemonic 133, and feed mnemonic 133 output to application program 111. Besides, at this time, learning processing is in halted state.

Next, explain feedback processing 125.

FIG. 26 is the flow diagram of feedback processing of implementation example 3 of this invention.

Feedback processing 125 includes steps S20-1~S20-4.

Step S20-1 is to determine to feed all of mnemonic 133 output data back to mnemonic 133 address, or feed part of mnemonic 133 output data back to mnemonic 133 address. Step S20-1 determines according to instructions from application program 111.

At step S20-1, step S20-2 is executed if application program 111 instructs to feed all of mnemonic 133 output data back to mnemonic 133 address. Step S20-2 is to instruct arithmetic board 105 to feed all of mnemonic 133 output data back to mnemonic 133 address.

At step S20-1, step S20-3 is executed if application program 111 instructs to feed part of mnemonic 133 output data back to mnemonic 133 address. Step S20-3 is to instruct arithmetic board 105 to feed part of mnemonic 133 output data back to mnemonic 133 address.

After all or part of mnemonic 133 output data are instructed to feedback to mnemonic 133 address at step S20-2 and step S20-3, step S20-4 is executed. Step S20-4 is to feed data of application program 111 to arithmetic board 105.

At step S20-2, if arithmetic board 105 instructs to feed all of mnemonic 133 output data back to mnemonic 133 address, output of mnemonic controller 132 and mnemonic 133 can both be controlled as address input of mnemonic 133. Therefore, dynamic arithmetic may be high-speed.

In addition, this implementation example explains mnemonic 133 is set to be one segment, yet multiple segments is also feasible FIG. 27 is the block diagram of modified example of arithmetic board of implementation example 3 of this invention. Assign the same symbols to the same parts as FIG. 15, leaving out explanations.

Arithmetic board 140 of this modified example connects n mnemonics 133-1~133-n with mnemonic controlled 132, so arithmetic equations can be wrote into n mnemonics 133-1~133-n in parallel.

According to this modified example, n mnemonics 133-1~133-n can store arithmetic equations in parallel.

FIG. 28 is the block diagram of other modified examples of arithmetic board of implementation example 3 of this invention. Assign the same symbols to the same parts as FIG. 15, leaving out explanations.

Arithmetic board 150 of this modified example is formed by n mnemonics 133-1133-n in series with data output as address input.

According to this modified example, one input can generates arithmetic results of n arithmetic equations As explained above, in this invention, arithmetic equation is stored in mnemonic according to frequency, so arithmetic can be executed by arithmetic equation selected by learning.

Besides, this invention is not confined to the above examples; a variety of modified examples within this invention scope can adapt to this invention.

The invention claimed is:

1. An arithmetic device comprising:
a first memory device arranged and configured to store a plurality of arithmetic equations in a table, the table including data input values and data output values associated with each of the plurality of arithmetic equations, wherein the data output values correspond to and are a result of a specific input data value applied to a specific one of the plurality of arithmetic equations;
a statistics table device arranged and configured to record the frequency of use of each of the plurality of arithmetic equations stored in the memory device;
an arithmetic board including a memory control device arranged and configured to monitor the frequency of use recorded in the statistics table and to determine the highest frequency of use;
a second memory device located on the arithmetic board, the second memory device arranged and configured to store the arithmetic equation whose frequency of use is the highest together with the data input values and data output values corresponding to that arithmetic equation; and
an output device arranged and configured to receive a request specifying an arithmetic equation and an input value to be applied to the arithmetic equation, wherein the output device is arranged and configured to determine if the requested arithmetic equation is stored in the second memory device and wherein the stored output data value is output from the second memory device if stored therein and output from the first memory device if not stored therein.

2. The arithmetic device according to claim 1, wherein the arithmetic device further includes a driver arranged and configured to extrapolate data output values for a set of data input values when the arithmetic equation associated with the data input values is not stored in the first and second memory devices.

3. The arithmetic device according to claim 2, wherein the driver includes a by-pass device that writes an arithmetic equation into the second memory on the arithmetic board according to an application program.

4. The arithmetic device according to claim 2, wherein the driver includes a feedback device that directs data output values from memory on the arithmetic board back to memory on the arithmetic board.

5. An arithmetic device according to claim 1, wherein the first memory device is composed of multiple memory units.

* * * * *